United States Patent
Yamazaki et al.

(10) Patent No.: US 8,387,437 B2
(45) Date of Patent: Mar. 5, 2013

(54) WEIGHT APPLYING UNIT FOR CALIBRATION AND WEIGHT APPLYING METHOD FOR CALIBRATION

(75) Inventors: Hitoshi Yamazaki, Kyoto (JP); Takeshi Nagareda, Kyoto (JP); Masahiko Umekawa, Yao (JP); Ryuji Ichikawa, Yao (JP); Takeshi Mori, Yao (JP); Kazuhiro Takeda, Yao (JP)

(73) Assignees: Nintendo Co., Ltd., Kyoto (JP); Hosiden Corporation, Osaka (JP)

( * ) Notice: Subject to any disclaimer, the term of this patent is extended or adjusted under 35 U.S.C. 154(b) by 952 days.

(21) Appl. No.: 12/010,033

(22) Filed: Jan. 18, 2008

(65) Prior Publication Data
US 2009/0107207 A1    Apr. 30, 2009

(30) Foreign Application Priority Data
Oct. 31, 2007    (JP) .................. 2007-283445

(51) Int. Cl.
*G01G 19/56* (2006.01)
(52) U.S. Cl. ........................................ 73/1.13
(58) Field of Classification Search ............ None
See application file for complete search history.

(56) References Cited

U.S. PATENT DOCUMENTS

| | | |
|---|---|---|
| 588,172 A | 8/1897 | Peters |
| 688,076 A | 12/1901 | Ensign |
| D188,376 S | 7/1960 | Hotkins et al. |
| 3,184,962 A | 5/1965 | Gay |
| 3,217,536 A | 11/1965 | Motsinger et al. |
| 3,424,005 A | 1/1969 | Brown |
| 3,428,312 A | 2/1969 | Machen |
| 3,712,294 A | 1/1973 | Muller |
| 3,752,144 A | 8/1973 | Weigle, Jr. |
| 3,780,817 A | 12/1973 | Videon |
| 3,826,145 A | 7/1974 | McFarland |
| 3,869,007 A | 3/1975 | Haggstrom et al. |
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |

(Continued)

FOREIGN PATENT DOCUMENTS

| | | |
|---|---|---|
| DE | 40 04 554 | 8/1991 |
| DE | 195 02 918 | 8/1996 |

(Continued)

OTHER PUBLICATIONS

Addlesee, M.D., et al., "The ORL Active Floor," IEEE—Personal Communications, Oct. 1997.

Baek, Seongmin, et al., "Motion Evaluation for VR-based Motion Training," Eurographics 2001, vol. 20, No. 3, 2001.

Chen, I-Chun, et al., "Effects of Balance Training on Hemiplegic Stroke Patients," Chang Gung Medical Journal, vol. 25, No. 9, pp. 583-590, Sep. 2002.

(Continued)

*Primary Examiner* — Robert R Raevis
(74) *Attorney, Agent, or Firm* — Nixon & Vanderhye P.C.

(57) ABSTRACT

A weight measuring apparatus, in which a load platform is supported by a plurality of load sensor sections and the weight of a measurement target object placed on the load platform is measured based on a load value detected by each of the plurality of load sensor sections, is supported by a support section. Thereafter, the weight applying section applies a predetermined load to each of the plurality of load sensor sections included in the supported weight measuring apparatus.

17 Claims, 13 Drawing Sheets

U.S. PATENT DOCUMENTS

| | | | |
|---|---|---|---|
| 4,404,854 A | 9/1983 | Krempl et al. | |
| 4,488,017 A | 12/1984 | Lee | |
| 4,494,754 A | 1/1985 | Wagner, Jr. | |
| 4,558,757 A | 12/1985 | Mori et al. | |
| 4,569,519 A | 2/1986 | Mattox et al. | |
| 4,574,899 A | 3/1986 | Griffin | |
| 4,577,868 A | 3/1986 | Kiyonaga | |
| 4,598,717 A | 7/1986 | Pedotti | |
| 4,607,841 A | 8/1986 | Gala | |
| 4,630,817 A | 12/1986 | Buckleu | |
| 4,658,921 A * | 4/1987 | Karpa | 177/50 |
| 4,660,828 A | 4/1987 | Weiss | |
| 4,680,577 A | 7/1987 | Straayer et al. | |
| 4,688,444 A | 8/1987 | Nordstrom | |
| 4,691,694 A | 9/1987 | Boyd et al. | |
| 4,711,447 A | 12/1987 | Mansfield | |
| 4,726,435 A | 2/1988 | Kitagawa et al. | |
| 4,739,848 A | 4/1988 | Tulloch | |
| 4,742,832 A | 5/1988 | Kauffmann et al. | |
| 4,742,932 A | 5/1988 | Pedragosa | |
| 4,800,973 A | 1/1989 | Angel | |
| 4,838,173 A | 6/1989 | Schroeder et al. | |
| 4,855,704 A | 8/1989 | Betz | |
| 4,880,069 A | 11/1989 | Bradley | |
| 4,882,677 A | 11/1989 | Curran | |
| 4,893,514 A | 1/1990 | Gronert et al. | |
| 4,907,797 A | 3/1990 | Gezari et al. | |
| 4,927,138 A | 5/1990 | Ferrari | |
| 4,970,486 A | 11/1990 | Gray et al. | |
| 4,982,613 A | 1/1991 | Becker | |
| D318,073 S | 7/1991 | Jang | |
| 5,044,956 A | 9/1991 | Behensky et al. | |
| 5,049,079 A | 9/1991 | Furtado et al. | |
| 5,052,406 A | 10/1991 | Nashner | |
| 5,054,771 A | 10/1991 | Mansfield | |
| 5,058,422 A * | 10/1991 | Shimauchi | 73/1.13 |
| 5,065,631 A | 11/1991 | Ashpitel et al. | |
| 5,089,960 A | 2/1992 | Sweeney, Jr. | |
| 5,103,207 A | 4/1992 | Kerr et al. | |
| 5,104,119 A | 4/1992 | Lynch | |
| 5,116,296 A | 5/1992 | Watkins et al. | |
| 5,118,112 A | 6/1992 | Bregman et al. | |
| 5,151,071 A | 9/1992 | Jain et al. | |
| 5,195,746 A | 3/1993 | Boyd et al. | |
| 5,197,003 A | 3/1993 | Moncrief et al. | |
| 5,199,875 A | 4/1993 | Trumbull | |
| 5,203,563 A | 4/1993 | Loper, III | |
| 5,207,426 A | 5/1993 | Inoue et al. | |
| 5,259,252 A | 11/1993 | Kruse et al. | |
| 5,269,318 A | 12/1993 | Nashner | |
| 5,299,810 A | 4/1994 | Pierce et al. | |
| 5,303,715 A | 4/1994 | Nashner et al. | |
| 5,360,383 A | 11/1994 | Boren | |
| 5,362,298 A | 11/1994 | Brown et al. | |
| 5,368,546 A | 11/1994 | Stark et al. | |
| 5,405,152 A | 4/1995 | Katanics et al. | |
| 5,431,569 A | 7/1995 | Simpkins et al. | |
| 5,462,503 A | 10/1995 | Benjamin et al. | |
| 5,466,200 A | 11/1995 | Ulrich et al. | |
| 5,469,740 A | 11/1995 | French et al. | |
| 5,474,087 A | 12/1995 | Nashner | |
| 5,476,103 A | 12/1995 | Nahsner | |
| 5,507,708 A | 4/1996 | Ma | |
| 5,541,621 A | 7/1996 | Nmngani | |
| 5,541,622 A | 7/1996 | Engle et al. | |
| 5,547,439 A | 8/1996 | Rawls et al. | |
| 5,551,445 A | 9/1996 | Nashner | |
| 5,551,693 A | 9/1996 | Goto et al. | |
| 5,577,981 A | 11/1996 | Jarvik | |
| D376,826 S | 12/1996 | Ashida | |
| 5,584,700 A | 12/1996 | Feldman et al. | |
| 5,584,779 A | 12/1996 | Knecht et al. | |
| 5,591,104 A | 1/1997 | Andrus et al. | |
| 5,613,690 A | 3/1997 | McShane et al. | |
| 5,623,944 A | 4/1997 | Nashner | |
| 5,627,327 A | 5/1997 | Zanakis | |
| D384,115 S | 9/1997 | Wilkinson et al. | |
| 5,669,773 A | 9/1997 | Gluck | |
| 5,689,285 A | 11/1997 | Asher | |
| 5,690,582 A | 11/1997 | Ulrich et al. | |
| 5,697,791 A | 12/1997 | Nasher et al. | |
| 5,713,794 A | 2/1998 | Shimojima et al. | |
| 5,716,274 A | 2/1998 | Goto et al. | |
| 5,721,566 A | 2/1998 | Rosenberg et al. | |
| 5,746,684 A | 5/1998 | Jordan | |
| 5,785,630 A | 7/1998 | Bobick et al. | |
| D397,164 S | 8/1998 | Goto | |
| 5,788,618 A | 8/1998 | Joutras | |
| 5,792,031 A | 8/1998 | Alton | |
| 5,800,314 A | 9/1998 | Sakakibara et al. | |
| 5,805,138 A | 9/1998 | Brawne et al. | |
| 5,813,958 A | 9/1998 | Tomita | |
| 5,814,740 A | 9/1998 | Cook et al. | |
| 5,820,462 A | 10/1998 | Yokoi et al. | |
| 5,825,308 A | 10/1998 | Rosenberg | |
| 5,832,417 A * | 11/1998 | Petrucelli et al. | 702/101 |
| 5,837,952 A | 11/1998 | Oshiro et al. | |
| D402,317 S | 12/1998 | Goto | |
| 5,846,086 A | 12/1998 | Bizzi et al. | |
| 5,853,326 A | 12/1998 | Goto et al. | |
| 5,854,622 A | 12/1998 | Brannon | |
| 5,860,861 A | 1/1999 | Lipps et al. | |
| 5,864,333 A | 1/1999 | O'Heir | |
| 5,872,438 A | 2/1999 | Roston | |
| 5,886,302 A | 3/1999 | Germanton et al. | |
| 5,888,172 A | 3/1999 | Andrus et al. | |
| 5,889,507 A | 3/1999 | Engle et al. | |
| D407,758 S | 4/1999 | Isetani et al. | |
| 5,890,995 A | 4/1999 | Bobick et al. | |
| 5,897,457 A | 4/1999 | Mackovjak | |
| 5,897,469 A | 4/1999 | Yalch | |
| 5,901,612 A | 5/1999 | Letovsky | |
| 5,902,214 A | 5/1999 | Makikawa et al. | |
| 5,904,639 A | 5/1999 | Smyser et al. | |
| D411,258 S | 6/1999 | Isetani et al. | |
| 5,912,659 A | 6/1999 | Rutledge et al. | |
| 5,919,092 A | 7/1999 | Yokoi et al. | |
| 5,921,780 A | 7/1999 | Myers | |
| 5,921,899 A | 7/1999 | Rose | |
| 5,929,782 A | 7/1999 | Stark et al. | |
| 5,947,824 A | 9/1999 | Minami et al. | |
| 5,976,063 A | 11/1999 | Joutras et al. | |
| 5,980,256 A | 11/1999 | Carmein | |
| 5,980,429 A | 11/1999 | Nashner | |
| 5,984,785 A | 11/1999 | Takeda et al. | |
| 5,987,982 A | 11/1999 | Wenman et al. | |
| 5,989,157 A | 11/1999 | Walton | |
| 5,993,356 A | 11/1999 | Houston et al. | |
| 5,997,439 A | 12/1999 | Ohsuga et al. | |
| 6,001,015 A | 12/1999 | Nishiumi et al. | |
| 6,007,428 A | 12/1999 | Nishiumi et al. | |
| 6,010,465 A | 1/2000 | Nashner | |
| D421,070 S | 2/2000 | Jang et al. | |
| 6,037,927 A | 3/2000 | Rosenberg | |
| 6,038,488 A | 3/2000 | Barnes et al. | |
| 6,044,772 A | 4/2000 | Gaudette et al. | |
| 6,063,046 A | 5/2000 | Allum | |
| 6,086,518 A | 7/2000 | MacCready, Jr. | |
| 6,102,803 A | 8/2000 | Takeda et al. | |
| 6,102,832 A | 8/2000 | Tani | |
| D431,051 S | 9/2000 | Goto | |
| 6,113,237 A | 9/2000 | Ober et al. | |
| 6,147,674 A | 11/2000 | Rosenberg et al. | |
| 6,152,564 A | 11/2000 | Ober et al. | |
| D434,769 S | 12/2000 | Goto | |
| D434,770 S | 12/2000 | Goto | |
| 6,155,926 A | 12/2000 | Miyamoto et al. | |
| 6,162,189 A | 12/2000 | Girone et al. | |
| 6,167,299 A | 12/2000 | Galchenkov et al. | |
| 6,190,287 B1 | 2/2001 | Nashner | |
| 6,200,253 B1 | 3/2001 | Nishiumi et al. | |
| 6,203,432 B1 | 3/2001 | Roberts et al. | |
| 6,216,542 B1 | 4/2001 | Stockli et al. | |
| 6,216,547 B1 | 4/2001 | Lehtovaara | |
| 6,220,865 B1 | 4/2001 | Macri et al. | |
| D441,369 S | 5/2001 | Goto | |
| 6,225,977 B1 | 5/2001 | Li | |

| | | |
|---|---|---|
| 6,227,968 B1 | 5/2001 | Suzuki et al. |
| 6,228,000 B1 | 5/2001 | Jones |
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,414,251 B1 * | 7/2002 | Edwards et al. ............... 177/145 |
| 6,421,056 B1 | 7/2002 | Nishiumi et al. |
| 6,436,058 B1 | 8/2002 | Krahner et al. |
| D462,683 S | 9/2002 | Ashida |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| 6,516,221 B1 | 2/2003 | Hirouchi et al. |
| D471,594 S | 3/2003 | Nojo |
| 6,539,771 B1 * | 4/2003 | Davidson et al. ............... 73/1.13 |
| 6,543,769 B1 | 4/2003 | Podoloff et al. |
| 6,546,817 B1 * | 4/2003 | Aoki ........................ 73/862.474 |
| 6,563,059 B2 | 5/2003 | Lee |
| 6,568,334 B1 | 5/2003 | Gaudette et al. |
| 6,603,082 B1 | 8/2003 | Delbrück et al. |
| 6,616,579 B1 | 9/2003 | Reinbold et al. |
| 6,621,015 B2 * | 9/2003 | Kusumoto et al. ............ 177/164 |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | LaVelle |
| RE40,427 E | 7/2008 | Nashner |
| 7,416,537 B1 | 8/2008 | Stark et al. |
| 7,472,439 B2 * | 1/2009 | Lemire et al. ..................... 5/607 |
| 7,530,929 B2 | 5/2009 | Feldman et al. |
| 7,722,501 B2 | 5/2010 | Nicolas et al. |
| 7,938,751 B2 | 5/2011 | Nicolas et al. |
| 2001/0001303 A1 | 5/2001 | Ohsuga et al. |
| 2001/0018363 A1 | 8/2001 | Goto et al. |
| 2001/0032742 A1 | 10/2001 | Yoshida |
| 2001/0050683 A1 | 12/2001 | Ishikawa et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0010543 A1 | 1/2003 | Montagnino |
| 2003/0054327 A1 | 3/2003 | Evensen |
| 2003/0056995 A1 * | 3/2003 | Johnson .................... 177/25.13 |
| 2003/0069108 A1 | 4/2003 | Kaiserman et al. |
| 2003/0107502 A1 | 6/2003 | Alexander |
| 2003/0176770 A1 | 9/2003 | Merril et al. |
| 2003/0178233 A1 | 9/2003 | Montagnino et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0127337 A1 | 7/2004 | Nashner |
| 2004/0148089 A1 | 7/2004 | Schmidt et al. |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | DiCuccio et al. |
| 2006/0097453 A1 | 5/2006 | Feldman et al. |
| 2006/0161045 A1 | 7/2006 | Merril et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |
| 2007/0155589 A1 | 7/2007 | Feldman et al. |
| 2007/0219050 A1 | 9/2007 | Merril |
| 2007/0251749 A1 * | 11/2007 | Breed et al. ..................... 180/273 |
| 2008/0012826 A1 | 1/2008 | Cunningham et al. |
| 2008/0228110 A1 | 9/2008 | Berme |
| 2008/0261696 A1 | 10/2008 | Yamazaki et al. |
| 2009/0093315 A1 | 4/2009 | Matsunaga et al. |

FOREIGN PATENT DOCUMENTS

| | | |
|---|---|---|
| DE | 297 12 785 | 1/1998 |
| DE | 20 2004 021 792 U1 | 5/2011 |
| DE | 20 2004 021 793 U1 | 5/2011 |

| | | |
|---|---|---|
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 A1 | 10/2000 |
| EP | 1 120 083 A2 | 8/2001 |
| EP | 1 127 599 A2 | 8/2001 |
| EP | 1 870 141 | 12/2007 |
| FR | 2 472 929 | 7/1981 |
| FR | 2 587 611 | 3/1987 |
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-034016 | 2/1987 |
| JP | 62-34016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 7-241281 | 9/1995 |
| JP | 7-241282 | 9/1995 |
| JP | 7-275307 | 10/1995 |
| JP | 7-302161 | 11/1995 |
| JP | 8-43182 | 2/1996 |
| JP | 08-131594 | 5/1996 |
| JP | 8-182774 | 7/1996 |
| JP | 08-182774 | 7/1996 |
| JP | 8-184474 | 7/1996 |
| JP | 08-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-235834 | 8/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | 3128216 | 12/2006 |
| JP | 2008-49117 | 3/2008 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | WO 2008/099582 | 8/2008 |

OTHER PUBLICATIONS

Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.

Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.

Harikae, Miho, "Visualization of Common People's Behavior in the Barrier Free Environment," Graduate Thesis—Master of Computer Science and Engineering in the Graduate School of the University of Aizu, Mar. 1999.

Hodgins, J.K., "Three-Dimensional Human Running," Proceedings: 1996 IEEE International Conference on Robotics and Automation, vol. 4, Apr. 1996.

Kim, Jong Yun, et al., "Abstract—A New VR Bike System for Balance Rehabilitation Training," Proceedings: 2001 IEEE Seventh International Conference on Virtual Systems and Multimedia, Oct. 2001.

McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.

NeuroCom International, Inc.—Neurogames—http://resourceonbalance.com/neurocom/products/NeuroGames.aspx.

Nicholas, Deborah S, "Balance Retraining After Stroke Using Force Platform Feedback," Physical Therapy, vol. 77, No. 5, pp. 553-558, May 1997.

Redfern, Mark, et al., "Visual Influences of Balance," Journal of Anxiety Disorders, vol. 15, pp. 81-94, 2001.

Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.

Tossavainen, Timo, et al., "Postural Control as Assessed with Virtual Reality," Acta Otolaryngol, Suppl 545, pp. 53-56, 2001.

Tossavainen, Timo, et al., "Towards Virtual Reality Simulation in Force Platform Posturography," MEDINFO, pp. 854-857, 2001.

Tsutsuguchi, Ken, et al., "Human Walking Animation Based on Foot Reaction Force in the Three-Dimensional Virtual World," The Journal of Visualization and Computer Animation, vol. 11, pp. 3-16, 2000.

Wong, Alice, et al., "The Devlopment and Clinical Evaluation of a Standing Biofeedback Trainer," Journal of Rehabilitation Research and Development, vol. 34, No. 3, pp. 322-327, Jul. 1997.

Yang, Ungyeon, et al., "Implementation and Evaluation of 'Just Follow Me': An Immersive, VR-Based, Motion-Training System," Presence, vol. 11, No. 3, pp. 304-323, 2002.

Interface, Inc.—Advanced Force Measurement—SM Calibration Certificate Installation Information, 1984.

Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.

Raghavendra S. Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.

D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.

Ludonauts, "Body Movin'," May 24, 2004, http://web.archive.org/web/20040611131903/http:/www.ludonauts.com; retrieved Aug. 31, 2010, 4 pages.

Atari Gaming Headquarters—AGH's Atari Project Puffer Page, http://www.atarihq.com/othersec/puffer/index.html, retrieved Sep. 19, 2002, 4 pages.

Michael Antonoff, "Real estate is cheap here, but the places you'd most want to visit are still under construction," Popular Science, Jun. 1993, pp. 33-34.

Steve Aukstakalnis and David Blatner, "The Art and Science of Virtual Reality—Silicon Mirage," 1992, pp. 197-207.

Electronics, edited by Michael Antonoff, "Video Games—Virtual Violence: Boxing Without Bruises," Popular Science, Apr. 1993, p. 60.

Stuart F. Brown, "Video cycle race," Popular Science, May 1989, p. 73.

Scanning the Field for Ideas, "Chair puts Player on the Joystick," Machine Design, No. 21, Oct. 24, 1991, XP 000255214, 1 page.

Francis Hamit, "Virtual Reality and the Exploration of Cyberspace," University of MD Baltimore County, 1993, 4 pages.

Ric Manning, "Videogame players get a workout with the Exertainment," The Gizmo Page from the Courier Journal Sep. 25, 1994, 1 page.

Tech Lines, Military—Arcade aces and Aviation—Winging it, Popular Mechanics, Mar. 1982, p. 163.

Sarju Shah, "Mad Catz Universal MC2 Racing Wheel: Mad Catz MC2 Universal," Game Spot, posted Feb. 18, 2005, 3 pages.

Joe Skorupa, "Virtual Fitness," Sports Science, Popular Mechanics, Oct. 1994, 3 pages.

Nintendo Zone—The History of Nintendo (1889-1997), retrieved Aug. 24, 1998 pp. 1, 9-10.

The Legible City, Computergraphic Installation with Dirk Groeneveld, Manhattan version (1989), Amsterdam version (1990), Karlsruhe version (1991), 3 pages.

The New Exertainment System. It's All About Giving Your Members Personal Choices, Life Fitness, Circle Reader Service Card No. 28, 1995, 1 page.

The Race Begins with $85, Randal Windracer, Circle Reader Service Card No. 34, 1990, 1 page.

Universal S-Video/Audio Cable; Product #5015, MSRP 9.99; http://www.madcatz.com/Default.asp?Page=133 &CategoryImg=Universal_Cables, retrieved May 12, 2005, 1 page.

Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.

Raymond W. McGorry, "A system for the measurement of grip forces and applied moments during hand tool use," Liberty Mutual Research Center for Safety and Health, Applied Ergonomics 32 (2001) 271-279.

NordicTrack's Aerobic Cross Trainer advertisement as shown in "Big Ideas—For a Little Money: Great Places to Invest $1,000 or Less," Kiplinger's Personal Finance Magazine, Jul. 1994, 3 pages.

Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.

Leigh Ann Roman, "Boing! Combines Arcade Fun with Physical Training," Memphis—Health Care News: Monitoring the Pulse of Our Health Care Community, Sep. 20, 1996, One Section, 1 page.

"No More Couch Potato Kids," as shown in Orange Coast, Sep. 1994, p. 16.

Gary L. Downey, et al., "Design of an Exercise Arcade for Children with Disabilities," Resna, Jun. 26-30, 1998, pp. 405-407.

Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.

Carolyn Cosmos, "An 'Out of Wheelchair Experience'", The Washington Post, May 2, 2000, 3 pages.

David H. Ahl, "Controller update," Creative Computing, vol. 9, No. 12, Dec. 1983, p. 142.

Ian Bogost, "Water Cooler Games—The Prehistory of Wii Fit," Videogame Theory, Criticism, Design, Jul. 15, 2007, 2 pages.

Jeremy Reimer, "A history of the Amiga, part 2: The birth of Amiga," last updated Aug. 12, 2007, 2 pages.

The Amiga Joyboard (1982) image, Photos: Fun with plastic—peripherals that changed gaming; http://news.cnet.com/2300-27076_3-10001507-2.html (retrieved Jul. 23, 2010), 1 page.

The Amiga Power System Joyboard, Amiga history guide, http://www.amigahistory.co.uk/joyboard.html (retrieved Jul. 23, 2010), 2 pages.

"Joyboard," Wikipedia—the free encyclopedia, http://en.wikipedia.org/wiki/Joyboard (retrieved Jul. 26, 2010), 2 pages.

"Dance Dance Revolution," Wikipedia—the free encyclopedia, http://en.wikipedia.org/wiki/Dance Dance Revolution (retrieved Jul. 23, 2010), 9 pages.

"Cure for the couch potato," Kansas City Star (MO), Jan. 2, 2005, WLNR 22811884, 1 page.

JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.

"Power Pad/Family Fun and Fitness/Family Trainer," http://www.gamersgraveyard.com/repository/nes/peripherals/powerpad.html (retrieved Jul. 26, 2010), 2 pages.

"Power Pad Information," Version 1.0 (Sep. 23, 1999) http://www.gamersgraveyard.com/repository/nes/peripherals/powerpad.txt (retrieved Jul. 26, 2010), 2 pages.

Wii+Power+Pad.jpg (image), http://bpl.blogger.com/_J5LEiGp54I/RpZbNpnLDgI/AAAAAAAAAic/Gum6DD3Umjg/s1600-h/Wii+Power+Pad.jpg (retrieved Jul. 26, 2010), 1 page.

Vs. Slalom—Videogame by Nintendo, KLOV—Killer List of Video Games, http://www.arcade-museum.com/game_detail.php?game_id=10368 (retrieved Jul. 26, 2010), 3 pages.

"Nintendo Vs. System," Wikipedia—the free encyclopedia, http://en.wikipedia.org/wiki/Nintendo_Vs._System (retrieved Jul. 26, 2010), 3 pages.

HyperspaceArcade.com—Specialists in Arcade Video Game Repair and Restoration, http://www.hyperspacearcade.com/VSTypes.html (retrieved Jul. 3, 2010), 3 pages.

Vs. Slalom—Attachment Pak Manual; For Installation in: Vs. UniSystem (UPRIGHT) and Vs. DualSystem (UPRIGHT), TM of Nintendo of America Inc., 1986, 15 pages.

Leiterman, "Project Puffer: Jungle River Cruise," Atari, Inc., 1982, 2 pages.

Leiterman, "Project Puffer: Tumbleweeds," Atari, Inc., 1982, 1 page.

Trevor Meers, "Virtually There: VR Entertainment Transports Players to Entrancing New Worlds," Smart Computing, vol. 4, Issue 11, Nov. 1993, 6 pages.

"Dance Aerobics," Moby Games, Feb. 12, 2008, 2 pages.

"The World's First Authentic Driving Simulation Game!", Hard Drivin'—Get Behind the Wheel and Feel the Thrill (image), Atari games Corporation, 1 page, (date unknown).

Electronic Entertainment Expo (E3) Overview, Giant Bomb—E3 2004 (video game concept), http://www.giantbomb.com/e3-2004/92/3436/ (retrieved Sep. 3, 2010), 3 pages.

Family Fun Fitness: Basic Set (Control Mat and Athletic World Game Pak), Nintendo Entertainment System, Bandai, (date unknown).

Michael Goldstein, "Revolution on Wheels—Thatcher Ulrich," Nov.-Dec. 1994, 3 pages.

Fitness article, Sep. 1994, p. 402-404.

"Wired Top 10: Best Selling Toys in Jun. 1994," Wired Sep. 1994, 1 page.

Katharine Alter, et al., "Video Games for Lower Extremity Strength Training in Pediatric Brain Injury Rehabilitation," National Rehabilitation Hospital, 18 pages, (date unknown).

Complaint for Patent Infringement, *IA Labs CA, LLC* v. *Nintendo Co., Ltd. and Nintendo of America, Inc.*, United States District Court for the District of Maryland Northern Division (Apr. 2, 2010), 317 pages.
Plaintiff IA Labs CA, LLC's Opening Claim Construction Brief, *IA Labs CA, LLC* v. *Nintendo Co., Ltd. and Nintendo of America, Inc.*, United States District Court for the District of Maryland Southern Division (Dec. 13, 2010), 36 pages.
Nintendo Co., Ltd. and Nintendo of America Inc.'s Opening Claim Construction Brief, *IA Labs CA, LLC* v. *Nintendo Co., Ltd. and Nintendo of America, Inc.*, United States District Court for the District of Maryland Southern Division (Dec. 13, 2010), 55 pages.
Plaintiff IA Labs CA, LLC's Response Claim Construction Brief, *IA Labs CA, LLC* v. *Nintendo Co., Ltd. and Nintendo of America, Inc.*, United States District Court for the District of Maryland Southern Division (Jan. 6, 2011), 49 pages.
Nintendo Co., Ltd. and Nintendo of America Inc.'s Closing Claim Construction Brief, *IA Labs Ca, LLC* v. *Nintendo Co., Ltd. and Nintendo of America, Inc.*, United States District Court for the District of Maryland Southern Division (Jan. 6, 2011), 25 pages.
Expert Report of Lee Rawls, Nov. 2, 2010, 37 pages. (redacted).
European Search Report issued for European Patent Application No. 11155149.5-2213, dated Apr. 21, 2011.
Nintendo Co., Ltd. and Nintendo of America's Opposition to IA Labs CA, LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including the Appendix of Exhibits and Exhibits A-R, 405 pages.
Declaration of R. Lee Rawls in Support of Nintendo Co., Ltd, and Nintendo of America Inc.'s Opposition to IA Labs CA. LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including Exhibits 1, 3-12, 193 pages.
Declaration of Tyler C. Peterson Pursuant to Fed. R. Civ. P. 56(D) in Support of Nintendo.Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), 7 pages.
Declaration of Tyler C. Peterson Pursuant to Fed. R. Civ. P. 56(D) in Support of Nintendo.Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Appendix of Exhibits, 2 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 1, 36 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 2, 40 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 3, 85 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 4, 10 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 5, 9 pages.
Declaration of Tyler C. Peterson Pursuant to Fed, R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 6, 17 pages.
Declaration or Tyler C. Peterson Pursuant to Fed, R, Civ, P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 7, 16 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 8, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 9, 4 pages.
Declaration of Tyler C. Peterson Pursuant to Fed, R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 10, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 11, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 12, 3 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 13, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd, et al.*, (Defendant), United States District Court for the District of Maryland Southern Division (May 16, 2011), Exhibit 14, 22 pages.
Declaration of Tyler C. Peterson Pursuant to Fed. R. Civ, P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 15, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 16, 42 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA*

*Labs CA, LLC*, (Plaintiff) v. *Nintendo Co., Ltd. et al.*, (Defendant), United States District Court for the District of Maryland Southern Division (May 16, 2011), Exhibit 17, 19 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd, et al.*, (Defendant), United States District Court for the District of Maryland Southern Division (May 16, 2011), Exhibit 18, 27 pages.
Declaration of Tyler C. Peterson Pursuant to Fed, R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 19, 13 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 20, 29 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 21, 25 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 22, 11 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 23, 20 pages.
Declaration of Tyler C. Peterson Pursuant to Fed, R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 24, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 25, 80 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 26, 32 pages.
U.S. Appl. No. 74/402,755, filed Jun. 14, 1993, 43 pages.
Borzelli G., Cappozzo A., and Papa E., "Inter- and intra-individual variability of ground rejection forces during sit-to-stand with principal component analysis," Medical Engineering & Physics 21 (1999), pp. 235-240.
Chiari L., Cappello A., Lenzi D., and Della Croce U, "An Improved Technique for the Extraction of Stochasitc Parameters from Stabilograms," Gait and Posture 12 (2000), pp. 225-234.
Cutlip R., Hsiao H., Garcia R., Becker E., Mayeux B., "A comparison of different postures for scaffold end-frame disassembly," Applied Ergonomics 31 (2000), pp. 507-513.
Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.

Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.
Jorgensen M.J., Marras W.S., "The effect of lumbar back support tension on trunk muscle activity," Clinical Biomechanics 15 (2000), pp. 292-294.
Deborah L. King and Vladimir M. Zatsiorsky, "Extracting gravity line displacement from stabilographic recordings," Gait & Posture 6 (1997), pp. 27-38.
Kraemer W.J., Volek J.S., Bush J.A., Gotshalk L.A., Wagner P.R., Gómez A.L., Zatsiorsky V.M., Duzrte M., Ratamess N.A., Mazzetti S.A., Selle B.J., "Influence of compression hosiery on physiological responses to standing fatigue in women," The Human Performance Laboratory, Medical & Science in Sports & Exercise, 2000, pp. 1849-1858.
Papa E. and Cappozzo A., "A telescopic inverted-pendulum model of the musculo-skeletal system and its use for the analysis of the sit-to-stand motor task," Journal of Biomechanics 32 (1999), pp. 1205-1212.
BERTEC: Dominate Your Field, Physician's Quick Guide, Version 1.0.0, Feb. 2010, 13 pages.
BERTEC: Dominate Your Field, Balancecheck Screener, Version 1.0.0, Feb. 2010, 35 pages.
BERTEC: Dominate Your Field, Balancecheck Trainer, Version 1.0.0, Feb. 2010, 37 pages.
U.S. Appl. No. 75/136,330, filed Jul. 19, 1996, 47 pages.
BERTEC: Dominate Your Field, Digita Acquire 4, Version 4.0.10, Mar. 2011, 22 pages.
BERTEC: Dominate Your Field, Bertec Force Plates, Version 1.0.0, Sep. 2009, 31 pages.
U.S. Appl. No. 73/542,230, filed Jun. 10, 1985, 52 pages.
Brent L. Arnold and Randy J, Schmitz, "Examination of Balance Measures Produced by the Biodex Stability System," Journal of Athletic Training, vol. 33(4), 1998, 323-327.
Trademark Registration No. 1,974 115 filed Mar. 28, 1994, 8 pages.
U.S. Appl. No. 75/471,542, filed Apr. 16, 1998, 102 pages.
Amin M., Girardi M., Konrad H.R., Hughes L., "A Comparison of Electronystagmorgraphy Results with Posturography Findings from the BalanceTrak 500," Otology Neurotology, 23(4), 2002, pp. 488-493.
Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.
Dr. Guido Pagnacco, Publications, 1997-2008, 3 pages.
College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).
EyeTracker, IDEAS, DIFRA, 501(k) Summary: premarket notification, Jul. 5, 2007, 7 pages.
Vestibular technologies, copyright 2000-2004, 1 page.
U.S. Appl. No. 75/508,272, filed Jun. 25, 1998, 36 pages.
U.S. Appl. No. 75/756,991, filed Jul. 21, 1999, 9 pages.
U.S. Appl. No. 76/148,037, filed Oct. 17, 2000, 78 pages.
Vestibular technologies, VTI Products: BalanceTRAK User's Guide, Preliminary Version 0.1, 2005, 34 pages.
U.S. Appl. No. 76/148,037, filed Oct. 17, 2000, 57 pages.
Vestibular Technologies, 2004 Catalog, 32 pages.
Memorandum in Support of Plaintiff IA Labs' Motion for Partial Summary Judgment on Defendants' Affirmative Defense and Counterclaim That U.S. Patent No. 7,121,982 Is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.
Search Report (2 pgs.) dated May 27, 2011 issued in German Application No. 20 2004 021 793.7.
European Search Report issued for European Patent Application No. 10172026.6-2213, dated Feb. 3, 2012.

* cited by examiner

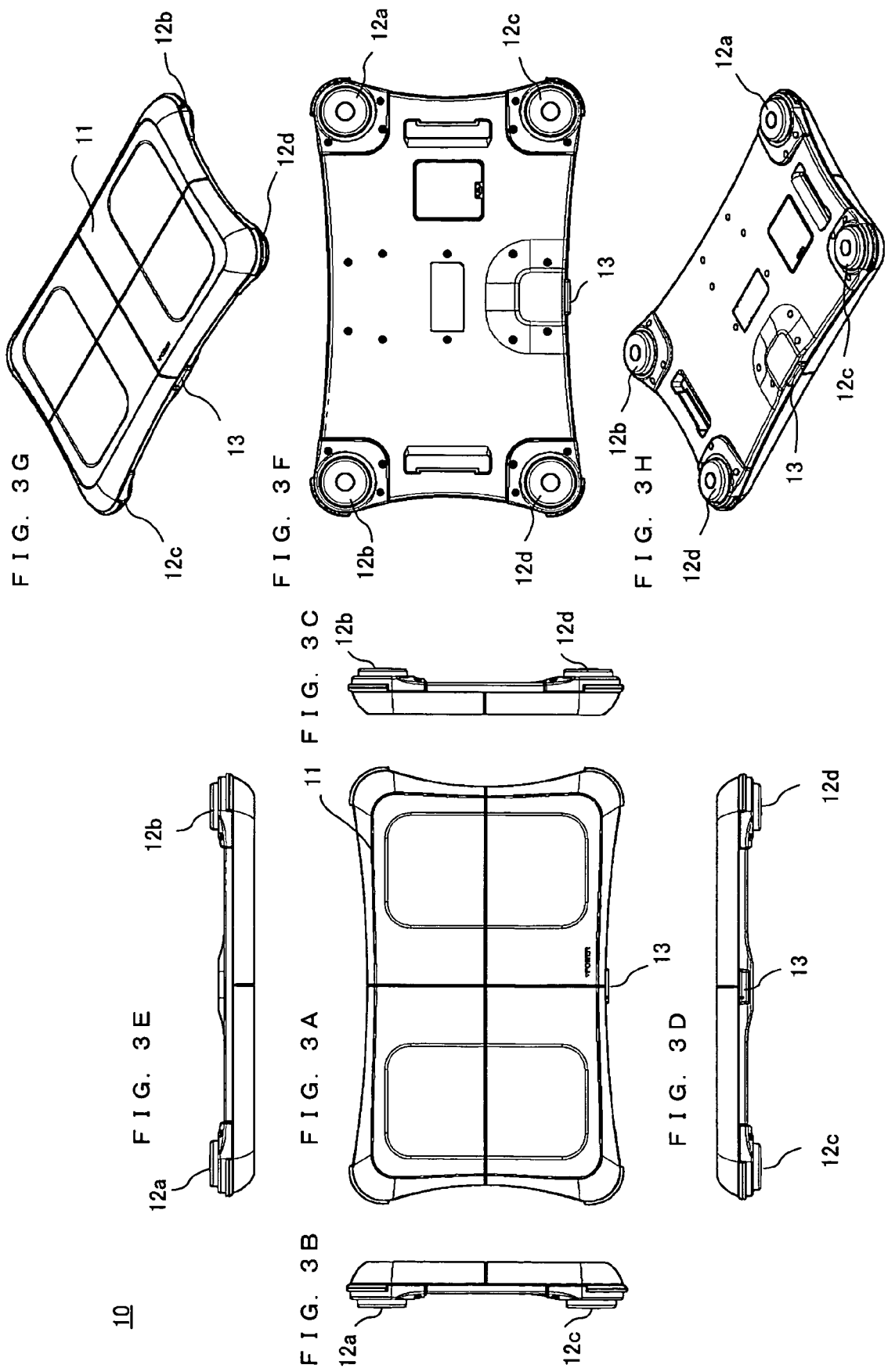

SECTION A-A

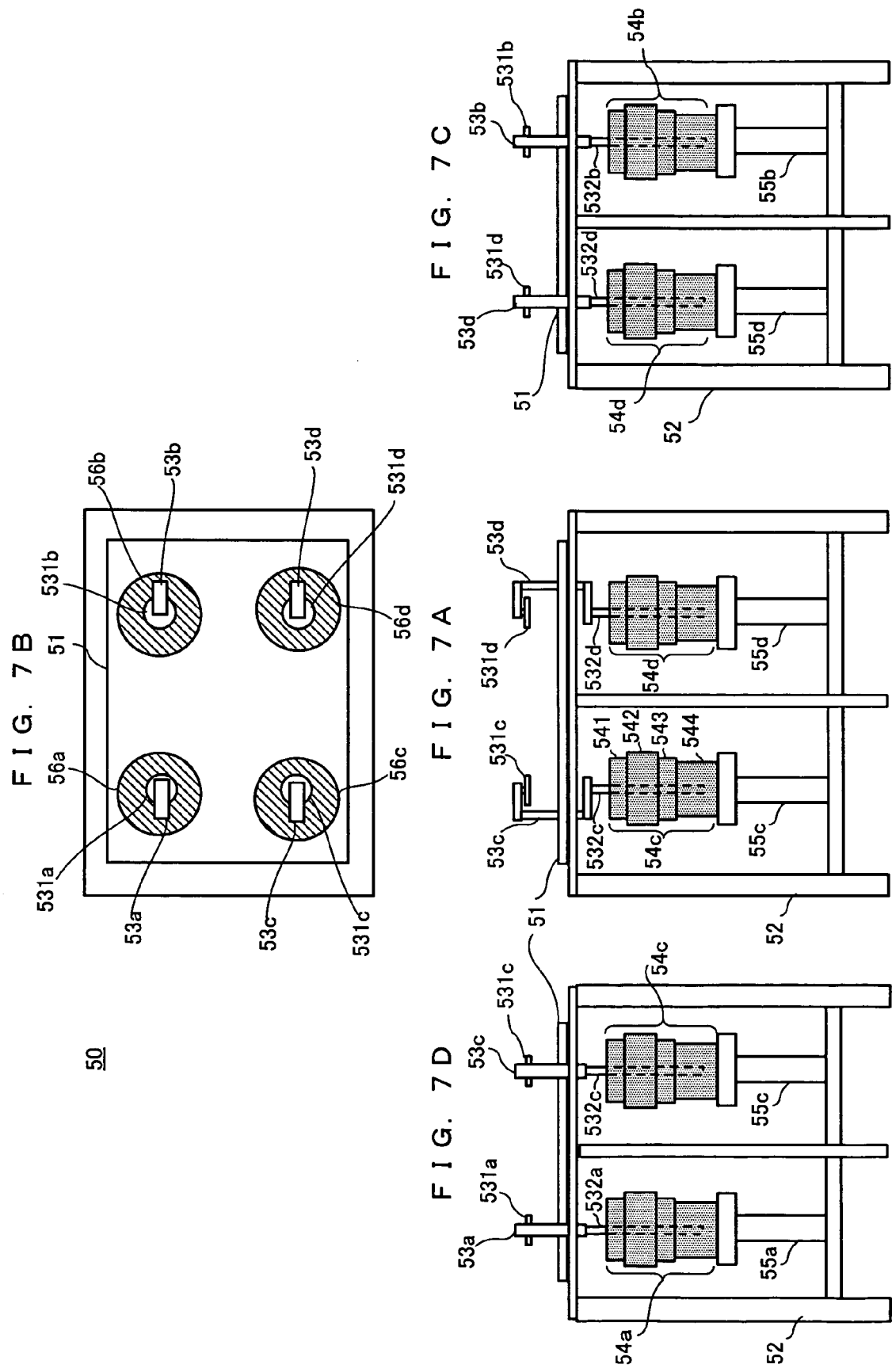

FIG. 9
|  | 0kg | 17kg | 34kg | ... |
|---|---|---|---|---|
| LOAD SENSOR SECTION 12a | 0.02 | 1.01 | 2.03 | ... |
| LOAD SENSOR SECTION 12b | 0.03 | 1.00 | 2.02 | ... |
| LOAD SENSOR SECTION 12c | 0.02 | 1.02 | 2.00 | ... |
| LOAD SENSOR SECTION 12d | 0.01 | 0.98 | 1.99 | ... |
FIG. 10
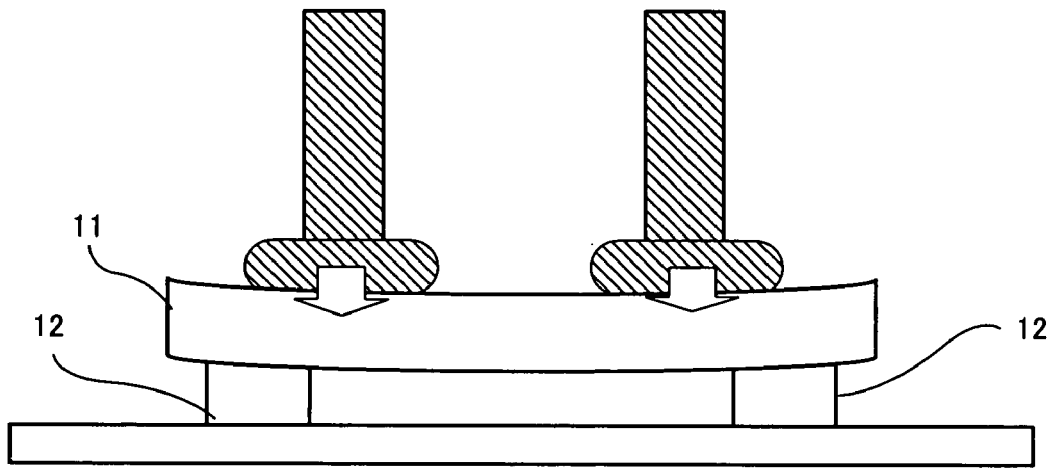
FIG. 11

F I G. 1 5

| SAMPLE NO | 34kg | 68kg | 102kg | 136kg |
|---|---|---|---|---|
| 1.000 | 33.761 | 67.666 | 101.585 | 135.558 |
| 2.000 | 33.777 | 67.642 | 101.571 | 135.527 |
| 3.000 | 33.853 | 67.757 | 101.653 | 135.547 |
| 4.000 | 33.785 | 67.636 | 101.518 | 135.439 |
| 5.000 | 33.785 | 67.646 | 101.515 | 135.446 |
| 6.000 | 33.857 | 67.714 | 101.605 | 135.501 |
| 7.000 | 33.835 | 67.726 | 101.587 | 135.516 |
| 8.000 | 33.834 | 67.784 | 101.689 | 135.651 |
| 9.000 | 33.832 | 67.696 | 101.525 | 135.388 |
| 10.000 | 33.771 | 67.651 | 101.504 | 135.385 |
| MAX | 33.857 | 67.784 | 101.689 | 135.651 |
| MIN | 33.761 | 67.636 | 101.504 | 135.385 |
| AVE | 33.809 | 67.692 | 101.575 | 135.496 |
| DIFFERENCE FROM REFERENCE VALUE | -0.191 | -0.308 | -0.425 | -0.504 |

F I G. 1 6

| SAMPLE NO | 34kg | 68kg | 102kg | 136kg |
|---|---|---|---|---|
| 1.000 | 33.980 | 68.041 | 102.072 | 136.193 |
| 2.000 | 33.974 | 68.023 | 102.071 | 136.188 |
| 3.000 | 33.989 | 68.085 | 102.156 | 136.285 |
| 4.000 | 33.998 | 68.033 | 102.067 | 136.092 |
| 5.000 | 33.933 | 68.009 | 101.995 | 136.060 |
| 6.000 | 34.069 | 68.134 | 102.172 | 136.249 |
| 7.000 | 33.962 | 67.995 | 102.015 | 136.064 |
| 8.000 | 33.959 | 68.013 | 102.006 | 136.057 |
| 9.000 | 33.949 | 67.941 | 101.978 | 136.097 |
| 10.000 | 33.916 | 67.943 | 101.964 | 136.048 |
| MAX | 34.069 | 68.134 | 102.172 | 136.285 |
| MIN | 33.916 | 67.941 | 101.964 | 136.048 |
| AVE | 33.973 | 68.022 | 102.050 | 136.133 |
| DIFFERENCE FROM REFERENCE VALUE | −0.027 | −0.022 | −0.049 | −0.133 |

US 8,387,437 B2

WEIGHT APPLYING UNIT FOR CALIBRATION AND WEIGHT APPLYING METHOD FOR CALIBRATION

CROSS REFERENCE TO RELATED APPLICATION

The disclosure of Japanese Patent Application No. 2007-283445, filed Oct. 31, 2007, is incorporated herein by reference.

BACKGROUND OF THE INVENTION

1. Field of the Invention

The present invention relates to a calibration of a weight measuring apparatus, and more particularly to a weight applying unit for performing a calibration on a weight measuring apparatus comprising a plurality of load sensors and a weight applying method of performing the same.

2. Description of the Background Art

In a weight measuring apparatus, using a load sensor, which is typified by a scale or the like, a calibration is performed on a load sensor-integrated weight measuring apparatus as a finished product, in order to improve an accuracy of measurement results. As a calibration method used for a weight measuring apparatus using a single load sensor, for example, a specific load of a weight is placed on a load platform at a center position thereof, and a calibration is performed based on a detected output of the load sensor. Also, there may be another weight measuring apparatus in which a single load platform is supported by a plurality of load sensors, and detected outputs of the plurality of respective load sensors are added to each other so as to obtain a weight value. Similarly to the weight measuring apparatus using the single load sensor, as a calibration method used for said another weight measuring apparatus comprising the plurality of load sensors, a specific load of a weight is placed on the load platform at a center position thereof, and a calibration is performed based on a total value of the detected outputs of the respective load sensors. Furthermore, as another calibration method, specific loads of weights are respectively placed on a load platform at predetermined positions such as four corners of the load platform, thereby performing a calibration based on detected outputs of the respective load sensors (Japanese Laid-Open Patent Publication No. 3-25325, for example).

In recent years, in the field of home fitness apparatuses or video games, when using the weight measuring apparatus comprising the plurality of load sensors, for example, it is requested that the weight measuring apparatus not only output the weight of a to-be-measured object placed on a load platform, but also recognize a balance state of the to-be-measured object such as the postural balance of a person on the load platform. In order to recognize the balance state of the to-be-measured object (e.g., a state where a human stands on his or her right foot and a greater amount of load is applied to a right side of the load platform), loads applied to the plurality of load sensors must be individually obtained. Further, in order to improve an accuracy of measurement results detected by the respective load sensors, a calibration must be performed on each of the load sensors, instead of performing the calibration based on the total value of the detected outputs of the respective load sensors.

In such a weight measuring apparatus integrated with the plurality of load sensors, as a method of performing a calibration on each of the load sensors, there may be a method in which the specific loads of the weights are placed on a load platform in respective four corners thereof, thereby performing the calibration on each of the load sensors based on an output of each of the load sensors (not based on the total value of the outputs of the respective load sensors), as disclosed in Japanese Laid-Open Patent Publication No. 3-25325.

However, in the aforementioned calibration method in which the weights are respectively placed in the four corners of the load platform, the weights are placed on the load platform, and therefore a load of each of the weights, which naturally should be applied in a perpendicular direction, is to be dispersed in other directions. For example, in the case of a weight measuring apparatus in which a load platform is supported by two load sensors 91 and 92 as shown in FIG. 17, it is assumed that a weight of 50 kg is placed on the load platform at a right side thereof. In this case, a value of 40 kg is detected in the load sensor 92 located under the weight, while a value of 10 kg is detected in the other load sensor 31, for example. That is, a load of 50 kg is distributed between the two load sensors. Furthermore, the value of 40 kg or 10 kg is used as an example in FIG. 17 in order to facilitate the description. In practice, however, it is difficult to accurately recognize how and in which direction the load of 50 kg is dispersed. Therefore, in such a calibration method, when a calibration is performed on each of the load sensors, it is extremely difficult to perform a proper calibration.

SUMMARY OF THE INVENTION

Therefore, an object of the present invention is to provide a weight applying unit for calibration and a weight applying method for calibration, both of which are capable of performing, in a weight measuring apparatus comprising a plurality of load sensors, a proper calibration on each of the load sensors.

The present invention has the following features to attain the object mentioned above. Note that reference numerals and figure numbers are shown in parentheses below for assisting a reader in finding corresponding components in the figures to facilitate the understanding of the present invention, but they are in no way intended to restrict the scope of the invention.

A first aspect is a weight applying unit for calibration used for performing a calibration on a weight measuring apparatus in which a load platform is supported by a plurality of load sensor sections and a weight of a measurement target object placed on the load platform is measured based on a load value detected by each of the plurality of load sensor sections, the weight applying unit for calibration comprising: a support section (51) and a weight applying section (53). The support section supports the weight measuring apparatus. The weight applying section applies predetermined loads to the plurality of load sensor sections, respectively.

According to the first aspect, a load can be individually applied to each of the plurality of load sensor sections.

In a second aspect based on the first aspect, the support section supports a load platform surface of the weight measuring apparatus such that the load platform surface is in a horizontal position. The weight applying section applies the predetermined loads to the plurality of load sensor sections, respectively, in a direction perpendicular to the load platform surface.

According to the second aspect, the load is applied in the direction perpendicular to the load platform surface. Thus, the load can be prevented from being dispersed, thereby making it possible to easily and assuredly apply the load.

In a third aspect based on the second aspect, the support section supports the weight measuring apparatus such that the load platform surface of the weight measuring apparatus faces a gravitational direction. The weight applying section applies the predetermined loads in a downward direction.

According to the third aspect, the load is applied in the gravitational direction. Thus, the load is not to be dispersed, thereby making it possible to more assuredly apply the load.

In a fourth aspect based on the first aspect, values of the predetermined loads applied by the weight applying section to the plurality of load sensor sections, respectively, are the same as one another.

According to the fourth aspect, the loads having the same value as one another are applied to the plurality of load sensor sections, respectively. Thus, it becomes possible to perform a calibration on each of the load sensor sections under the same condition.

In a fifth aspect based on the first aspect, the weight applying unit for calibration further comprises a deflection generating portion (61) for generating deflection by applying a predetermined pressure to a load platform surface of the weight measuring apparatus.

According to the fifth aspect, the load can be applied assuming a condition where the weight measuring apparatus is actually used (i.e., where the deflection is generated). Thus, it becomes possible to perform a more proper calibration.

In a sixth aspect based on the fifth aspect, the support section has a placement table for placing the weight measuring apparatus thereon. The weight measuring apparatus is placed on the placement table such that the load platform surface of the weight measuring apparatus and a load surface of the placement table face horizontally toward each other. Further, the deflection generating portion is a elastic body disposed so as to be interposed between the load surface of the placement table and the load platform surface of the weight measuring apparatus.

According to the sixth aspect, the condition where the weight measuring apparatus is actually used can be easily created. Furthermore, since the elastic body is used, even if a press is applied to an end of the deflection generating portion, the generated deflection of the weight measuring apparatus can be prevented from being hampered. Still furthermore, it becomes possible to prevent the load platform surface of the weight measuring apparatus from being damaged through calibration steps.

In a seventh aspect base on the sixth aspect, the deflection generating portion is an elastic body having a shape simulating an area in which the measurement target object contacts the load platform.

In an eighth aspect based on the sixth aspect, the deflection generating portion is an elastic body having a Shore hardness of Shore A70.

According to the seventh and eighth aspects, the deflection more similar to that under actual usage conditions can be generated.

In a ninth aspect based on the sixth aspect, the deflection generating portion is made of ester polyurethane.

According to the ninth aspect, even if a pressure is applied to an end of the deflection generating portion, the generated deflection of the weight measuring apparatus can be prevented from being hampered. Furthermore, it becomes possible to prevent the load platform surface of the weight measuring apparatus from being damaged through the calibration steps.

In a tenth aspect based on the second aspect, the weight applying unit for calibration further comprises a deflection generating portion (61) for generating deflection by applying a predetermined pressure to a load platform surface of the weight measuring apparatus.

According to the tenth aspect, it becomes possible to obtain an effect similar to that of the fifth aspect.

In an eleventh aspect based on the tenth aspect, the support section has a placement table for placing the weight measuring apparatus thereon. The weight measuring apparatus is placed on the placement table such that the load platform surface of the weight measuring apparatus and a load surface of the placement table face horizontally toward each other. Furthermore, the deflection generating portion is an elastic body disposed so as to be interposed between the load surface of the placement table and the load platform surface of the weight measuring apparatus.

According to the eleventh aspect, it becomes possible to obtain an effect similar to that of the sixth aspect.

In a twelfth aspect based on the eleventh aspect, the deflection generating portion is an elastic body having a shape simulating an area in which the measurement target object contacts the load platform.

According to the twelfth aspect, it becomes possible to obtain an effect similar to that of the seventh aspect.

In a thirteenth aspect based on the third aspect, the weight applying unit for calibration further comprises a deflection generating portion (61) for generating deflection by applying a predetermined pressure to the load platform surface of the weight measuring apparatus.

According to the thirteenth aspect, it becomes possible to obtain an effect similar to that of the fifth aspect.

In a fourteenth aspect based on the thirteenth aspect, the support section has a placement table for placing the weight measuring apparatus thereon. The weight measuring apparatus is placed on the placement table such that the load platform surface of the weight measuring apparatus and a load surface of the placement table face horizontally toward each other. Furthermore, the deflection generating portion is an elastic body disposed so as to be interposed between the load surface of the placement table and the load platform surface of the weight measuring apparatus.

According to the fourteenth aspect, it becomes possible to obtain an effect similar to that of the sixth aspect.

In a fifteenth aspect based on the fourteenth aspect, the deflection generating portion is an elastic body having a shape simulating an area in which the measurement target object contacts the load platform.

According to the fifteenth aspect, it becomes possible to obtain an effect similar to that of the seventh aspect.

In a sixteenth aspect based on the fourth aspect, the weight applying unit for calibration further comprises a deflection generating portion (61) for generating deflection by applying a predetermined pressure to a load platform surface of the weight measuring apparatus.

According to the sixteenth aspect, it becomes possible to obtain an effect similar to that of the fifth aspect.

In a seventeenth aspect based on the sixteenth aspect, the support section has a placement table for placing the weight measuring apparatus thereon. The weight measuring apparatus is placed on the placement table such that the load platform surface of the weight measuring apparatus and a load surface of the placement table face horizontally toward each other. Furthermore, the deflection generating portion is an elastic body disposed so as to be interposed between the load surface of the placement table and the load platform surface of the weight measuring apparatus.

According to the seventeenth aspect, it becomes possible to obtain an effect similar to that of the sixth aspect.

In an eighteenth aspect based on the seventeenth aspect, the deflection generating portion is an elastic body having a shape simulating an area in which the measurement target object contacts the load platform.

According to the eighteenth aspect, it becomes possible to obtain an effect similar to that of the seventh aspect.

In a nineteenth aspect based on the first aspect, the weight applying unit for calibration further comprises a detection value obtaining section and a setting section. The detection value obtaining section obtains a detection value outputted from each of the plurality of load sensor sections to which the predetermined loads are applied, respectively, by the weight applying section. The setting section sets the detection value obtained by the detection value obtaining section in the weight measuring apparatus so as to be associated with each of the load sensor sections which has outputted the detection value.

In a twentieth aspect based on the nineteenth aspect, the weight applying section can calibrate the load value applied to each of the plurality of load sensor sections. The setting section sets, in the weight measuring apparatus, data detected based on a plurality of load values by applying loads having values different from each other.

According to the nineteenth and twentieth aspects, it becomes possible to cause the weight measuring apparatus to store calibration results, thereby improving usability of the weight applying unit for calibration.

A twenty-first aspect is a weight applying method for calibration used for performing a calibration on a weight measuring apparatus in which a load platform is supported by a plurality of load sensor sections, and a calculation process is performed on a load value detected by each of the plurality of load sensor sections so as to measure a weight of a measurement target object placed on the load platform, the weight applying method for calibration comprising: a supporting step (step 1); and a weight applying step (step 4, 5). The supporting step supports the weight measuring apparatus. The weight applying step respectively applies predetermined loads to the plurality of load sensor sections included in the weight measuring apparatus supported by the supporting step.

According to the twenty-first aspect, it becomes possible to obtain an effect similar to that of the first aspect.

According to the present invention, a load can be applied individually to each of the plurality of load sensor sections. Thus, it becomes possible to perform a more proper calibration on each of the load sensor sections.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a diagram illustrating an example of an external view of a weight measuring apparatus 10 according to embodiments of the present embodiment;

FIG. 3B is a diagram illustrating the example of the external view of the weight measuring apparatus 10 according to embodiments of the present embodiment;

FIG. 3C is a diagram illustrating the example of the external view of the weight measuring apparatus 10 according to embodiments of the present embodiment;

FIG. 3D is a diagram illustrating the example of the external view of the weight measuring apparatus 10 according to embodiments of the present embodiment;

FIG. 3E is a diagram illustrating the example of the external view of the weight measuring apparatus 10 according to embodiments of the present embodiment;

FIG. 3F is a diagram illustrating the example of the external view of the weight measuring apparatus 10 according to embodiments of the present embodiment;

FIG. 3G is a diagram illustrating the example of the external view of the weight measuring apparatus 10 according to embodiments of the present embodiment;

FIG. 3H is a diagram illustrating the example of the external view of the weight measuring apparatus 10 according to embodiments of the present embodiment;

FIG. 7A is a diagram schematically illustrating an example of a weight applying unit 50 according to the embodiments of the present invention;

FIG. 7B is a diagram schematically illustrating the example of the weight applying unit 50 according to the embodiments of the present invention;

FIG. 7C is a diagram schematically illustrating the example of the weight applying unit 50 according to the embodiments of the present invention;

FIG. 7D is a diagram schematically illustrating the example of the weight applying unit 50 according to the embodiments of the present invention;

FIG. 9 shows an example of data stored in a microcomputer 31;

FIG. 10 is a schematic diagram illustrating a state where the weight measuring apparatus 10 is actually used;

FIG. 11 is a schematic diagram illustrating a state where a load cell is actually used;

FIG. 15 is a table showing measurement results obtained when using the weight measuring apparatus 10 on which a calibration is performed by a method according to a first embodiment;

FIG. 16 is a table showing measurement results obtained when using the weight measuring apparatus 10 on which the calibration is performed by a method according to a second embodiment.

DESCRIPTION OF THE PREFERRED EMBODIMENTS

First Embodiment

Hereinafter, embodiments of the present invention will be described with reference to the drawings. Note that the embodiments to be described below are not limited to the present invention.

Figure 1:
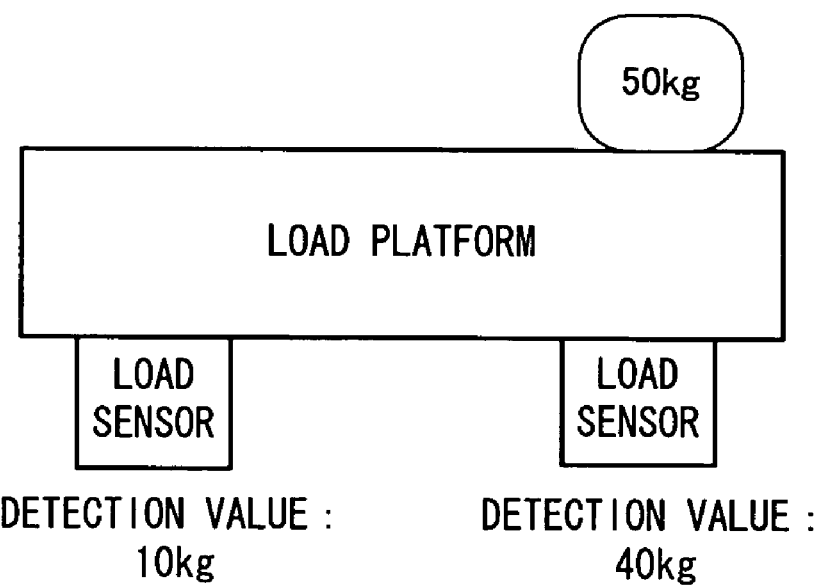
FIG. 1 is a diagram describing a principle of a weight applying/calibration method according to the present invention.
Figure 2:
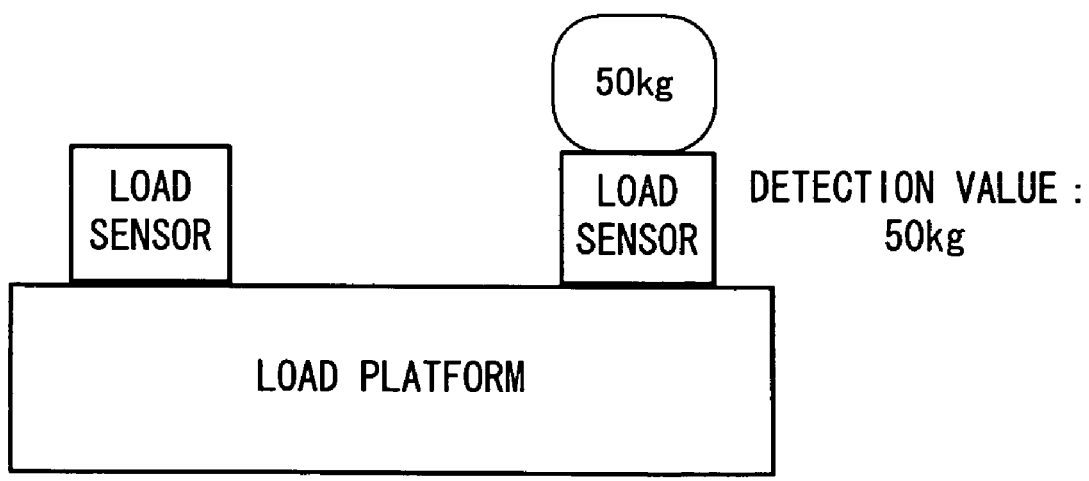
FIG. 2 is another diagram describing the principle of the weight applying/calibration method according to the present invention.

Firstly, a principle of a weight applying/calibration method according to a first embodiment will be described. As shown in FIG. 1, in a conventional weight applying/calibration method in which a weight is placed on a load platform with a plurality of load sensors (i.e., leg portions) of a weight measuring apparatus facing downward, one load is distributed among the plurality of load sensors, and thus a proper calibration cannot be performed. On the other hand, according to the present invention, instead of performing a calibration by placing a weight on the load platform so as to indirectly apply weight to the load sensors, the calibration is performed by directly applying the weight to load sensor sections 12. That is to say, as shown in FIG. 2, the calibration is performed by applying weight to one load sensor in such a manner that the weight applied to the one load sensor is assuredly not to be distributed with the other load sensor.

Hereinafter, the weight applying/calibration method according to the first embodiment will be described in detail. FIG. 3A is a diagram illustrating an example of an external view of a weight measuring apparatus 10 (a scale, typically). FIG. 3B is a left side view illustrating the example of the external view of the weight measuring apparatus 10. FIG. 3C is a right side view illustrating the example of the external view of the weight measuring apparatus 10. FIG. 3D is a front view illustrating the example of the external view of the weight measuring apparatus 10. FIG. 3E is a back view illustrating the example of the external view of the weight measuring apparatus 10. FIG. 3F is a bottom view illustrating the example of the external view of the weight measuring apparatus 10. FIG. 3G is a perspective view as viewed from a top of the weight measuring apparatus 10. FIG. 3H is a perspective view as viewed from a bottom of the weight measuring apparatus 10. The weight measuring apparatus 10 comprises a load platform 11 on which a user stands, the four load sensor sections 12 respectively provided on a bottom surface of the load platform 11 in four corners thereof, and a connector 13 connectable to a predetermined external apparatus.

Figure 4A:
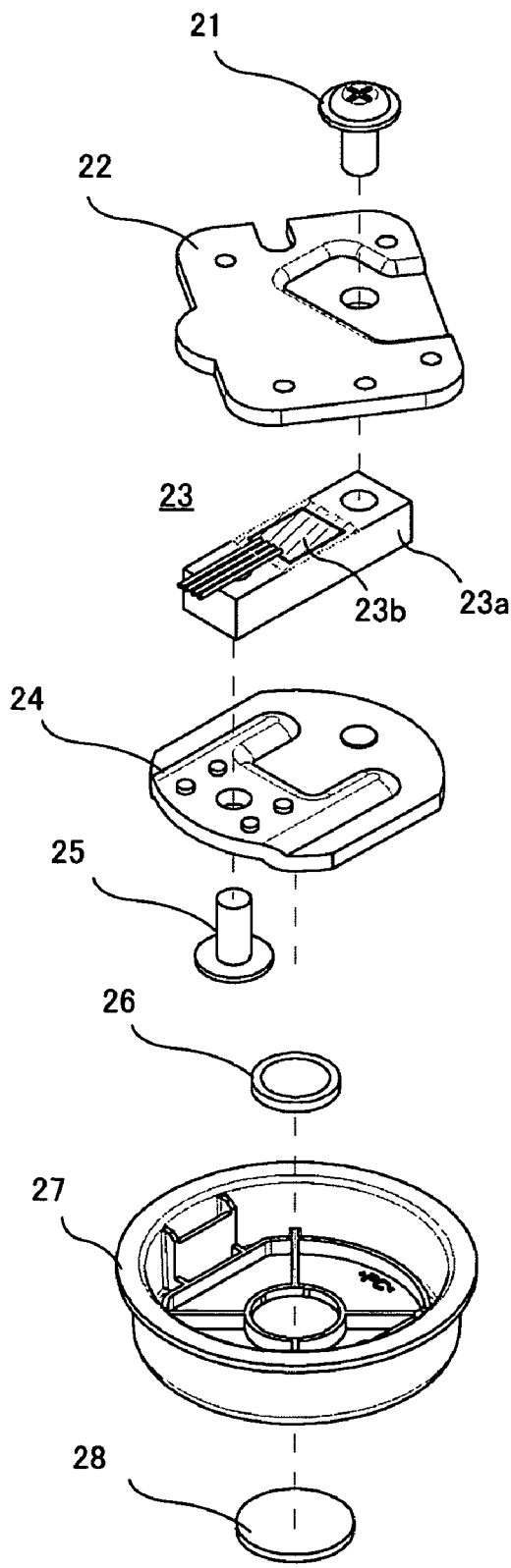
FIG. 4A is a diagram illustrating an example of a structure of a load sensor section 12.
Figure 4B:
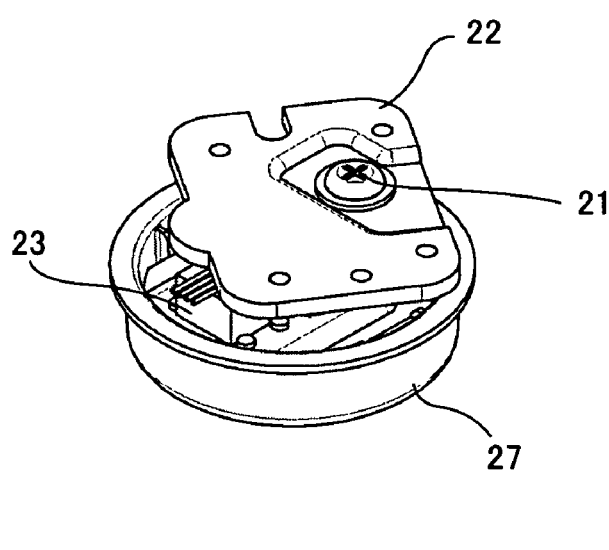
FIG. 4B is a diagram illustrating the example of the structure of the load sensor section 12.
Figure 4C:
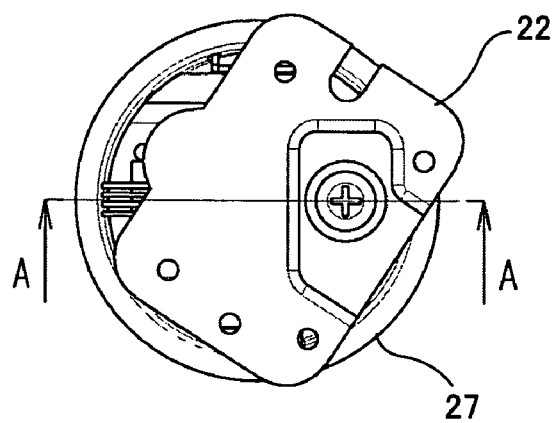
FIG. 4C is a diagram illustrating the example of the structure of the load sensor section 12.
Figure 4D:
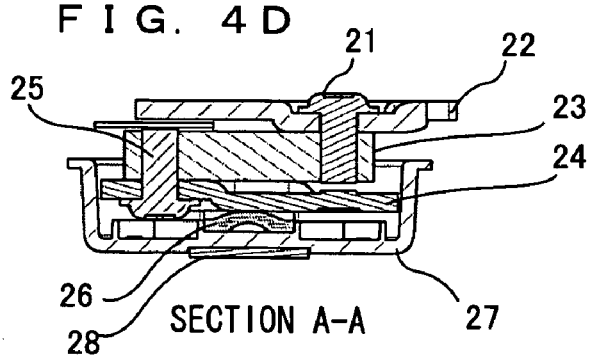
FIG. 4D is a diagram illustrating the example of the structure of the load sensor section 12.

Each of the load sensor sections 12 detects a load applied to the load platform 11. FIG. 4A is an exploded view illustrating an example of a structure of each of the load sensor sections 12. FIG. 4B is a perspective view illustrating the example of the structure of each of the load sensor sections 12. FIG. 4C is a top view illustrating the example of the structure of each of the load sensor sections 12. FIG. 4D is a cross-sectional view along lines A-A shown in FIG. 4C. In FIGS. 4A to 4D, each of the load sensor sections 12 includes an upper plate 22, a load cell 23, a lower plate 24, screws 21 and 25, a load receiving plate 26, a housing 27, and a rubber leg 28. As shown in FIG. 4A, the load cell 23 is disposed so as to be interposed between the upper plate 22 and the lower plate 24. The screw 21 is inserted so as to pass through a hole provided with the upper plate 22 and a hole, corresponding to the hole of the upper plate 22, which is provided with the load cell 23. Similarly, the screw 25 is inserted so as to pass through a hole provided with the lower plate 24, and a hole, corresponding to the hole of the lower plate 24, which is provided with the load cell 23. Thus, the load cell 23 is fixed by means of the upper plate 22 and the lower plate 24. Furthermore, the load receiving plate 26 is disposed in a center portion of the interior of the housing 27, and the load cell 23 fixed by means of the upper plate 22 and the lower plate 24 is disposed above the load receiving plate 26. The rubber leg 28 is disposed in a center portion of a bottom surface of the housing 27.

The load cell 23 is a strain gage type load cell, for example. The load cell 23 is a load conversion unit for converting an inputted load into an electrical signal. In the load cell 23, a strain element 23a is deformed in accordance with the inputted load, thereby generating a strain. A strain sensor 23b attached to the strain element 23a converts the strain into a value indicating an electrical resistance change so as to be further converted into a value indicating a voltage change. Therefore, the load cell 23 outputs a voltage signal indicating the inputted load from an input terminal when a voltage is applied from a power terminal.

The housing 27 is formed so as to have a substantially bottomed cylindrical shape by plastic molding, for example.

Figure 5:
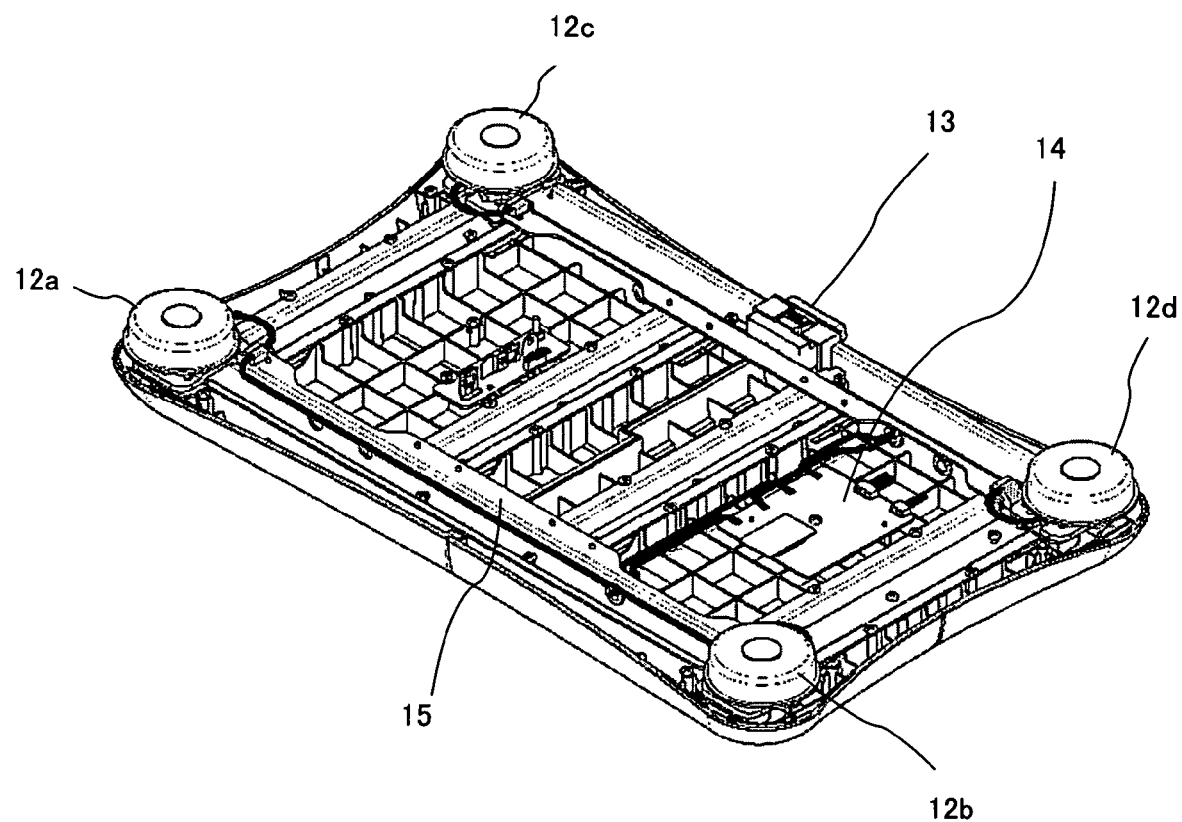
FIG. 5 is a diagram illustrating the interior of the weight measuring apparatus 10 according to the embodiments of the present invention.

FIG. 5 is a perspective view illustrating the interior of the weight measuring apparatus 10. In FIG. 5, a frame 15, disposed along the periphery of the weight measuring apparatus 10, acts as a skeletal structure of the weight measuring apparatus 10. Furthermore, a microcomputer board 14, on which a microcomputer 31 to be described later is mounted, is located in the interior of the weight measuring apparatus 10. The microcomputer board 14 is electrically connected to the four load sensor sections 12 (more precisely, the load cells 23) respectively provided in the four corners of the weight measuring apparatus 10 and the connector 13.

Figure 6:
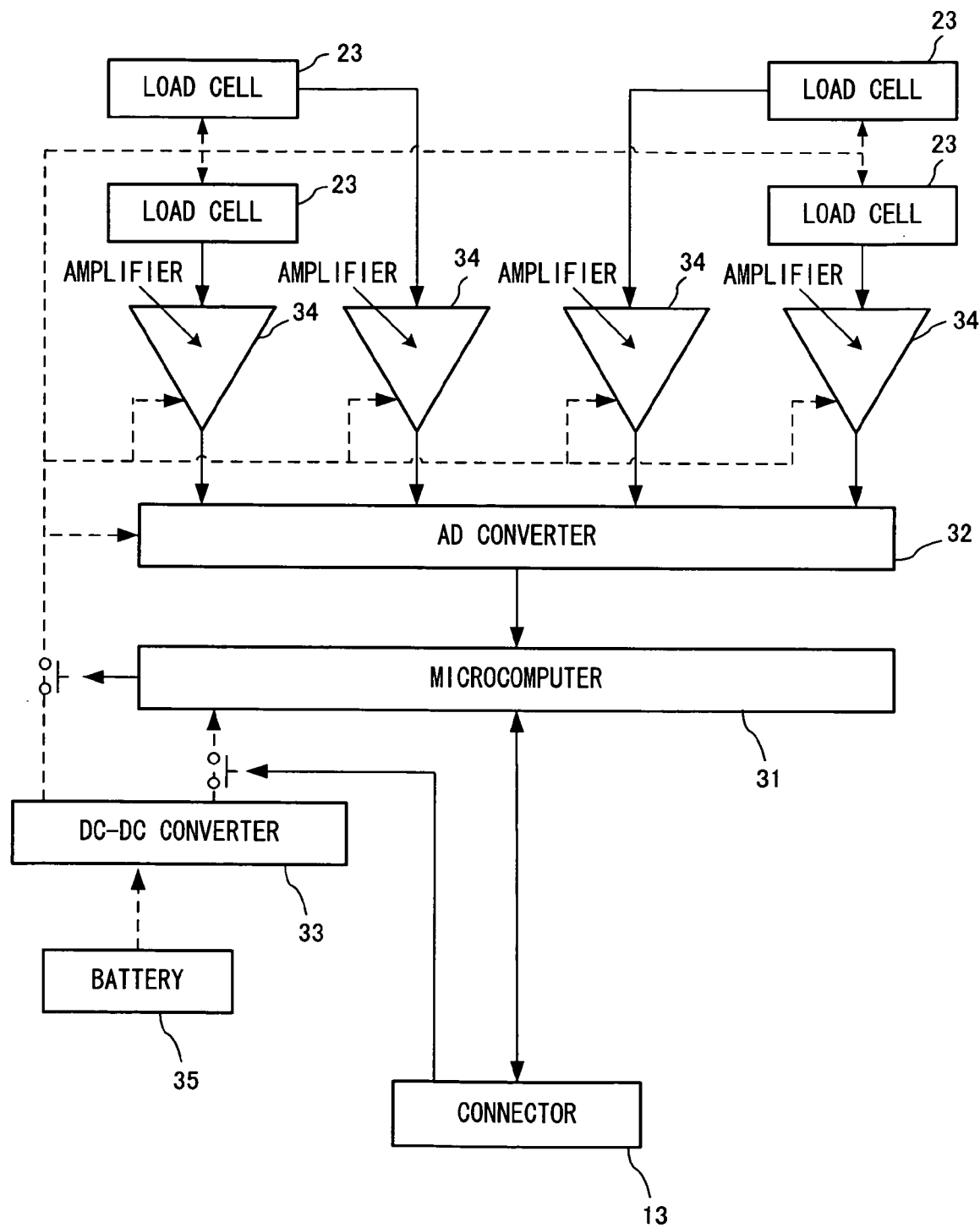
FIG. 6 is a diagram illustrating an example of an electrical configuration of the weight measuring apparatus 10 according to the embodiments of the present invention.

FIG. 6 is a diagram illustrating an example of an electrical configuration of the weight measuring apparatus 10. In FIG. 6, solid-line arrows indicate signal and communication flows, and dashed-line arrows indicate a power supply.

The weight measuring apparatus 10 further comprises the microcomputer 31 for controlling an operation thereof. The microcomputer 31 includes a ROM, RAM and the like, all of which are not shown, and controls the operation of the weight measuring apparatus 10 in accordance with a program stored in the ROM. Further, the RAM is, for example, a nonvolatile memory such as a flash memory.

An AD converter 32, the connector 13 and a DC-DC converter 33 are connected to the microcomputer 31. The load cells 23 included in the load sensor sections 12, respectively, are connected to the AD converter 32 via respective amplifiers 34.

The connector 13 is provided so as to allow the weight measuring apparatus 10 to communicate with the predetermined external apparatus such as a personal computer or a game apparatus.

Furthermore, a battery 35 is mounted in the weight measuring apparatus 10 for a power supply. In the present embodiment, the external apparatus connected to the weight measuring apparatus 10 by means of the connector 13 controls a power supply to the microcomputer 31. On the other hand, the microcomputer 31 controls a power supply to the load cells 23, the amplifiers 34 and the AD converter 32. To the load cells 23, the amplifiers 34, the microcomputer 31 and the AD converter 32, a power is supplied from the battery 35 via the DC-DC converter 33. The DC-DC converter 33 converts a voltage value of a DC current drawn from the battery 35 into a different voltage value, so as to be outputted to the load cells 23, the amplifiers 34, the microcomputer 31 and the AD converter 32.

When a power is supplied, each of the load cells 23 outputs a signal indicating the inputted load. The signal is amplified by each of the amplifiers 34, and the amplified analog signal is converted by the AD converter 32 into a digital signal so as to be inputted to the microcomputer 31. Identification information of each load cell 23 is assigned to a detection value of the load cell 23 so as to be distinguishable from detection values of the other load cells 23. As described above, the microcomputer 31 can obtain data indicating the detection values of the four respective load cells 23 at the same time. Then, the data indicating the detection values of the respective load cells 23 is transmitted from the microcomputer 31 to the external apparatus via the connector 13.

Next, a weight applying unit used in the first embodiment will be described. The weight applying unit is used for applying weight to the load sensor sections 12. FIG. 7A is a front view schematically illustrating a weight applying unit 50. FIG. 7B is a plan view schematically illustrating the weight applying unit 50. FIG. 7C is a right side view schematically illustrating the weight applying unit 50. FIG. 7D is a left side view schematically illustrating the weight applying unit 50.

In FIGS. 7A to 7D, the weight applying unit 50 comprises a placement table 51, leg portions 52 for supporting the placement table 51, four hook portions 53a to 53d mounted so as to perpendicularly penetrate the placement table 51, a plurality of weights 54a to 54d detachable from the four hook portions 53a to 53d, respectively, and four hoisting and lowering mechanisms 55a to 55d disposed at positions corresponding to the hook portions 53a to 53d, respectively.

Furthermore, as shown in FIG. 7B, the placement table 51 has four through holes 56a to 56d provided therethrough. Each through hole 56 is provided at a position corresponding to each of the four corners of the weight measuring apparatus 10 placed on the placement table 51, that is, a position corresponding to a position of each of the load sensor sections 12.

The four hook portions 53a to 53d have circular shaped load applying plates 531a to 531d, and attachment portions 532a to 532d for attaching the weights 54 thereto, respectively. As shown in FIG. 7A or the like, each of the hook portions 53 is disposed through the through hole 56 such that the load applying plate 531 is located above the placement table and the attachment portion 532 is located below the placement table 51. That is, when each of the weights 54 is attached to the attachment portion 532, the entirety of the hook portion 53 is perpendicularly lowered by the weight of the attached weight 54.

Each of the weights 54 is detachable from the attachment portion 532. Furthermore, each weight 54 is formed of a plurality of weight parts (541 to 544 in FIG. 7A), and the weight applied to the hook portion 53 is adjustable depending on the number of the weight parts attached to the attachment portion.

Each of the hoisting and lowering mechanisms 55 is used to carry the weight 54 in an up and down direction when performing a process of attaching the weight 54 to the attachment portion 532.

Next, the weight applying/calibration method according to the first embodiment will be described. In the first embodiment, a load is directly applied to each of the load sensor sections 12 in such a manner as described above so as to cause the microcomputer 31 of the weight measuring apparatus 10 to store a value outputted from each of the load sensor sections 12, thereby performing a calibration.

Figure 8A:
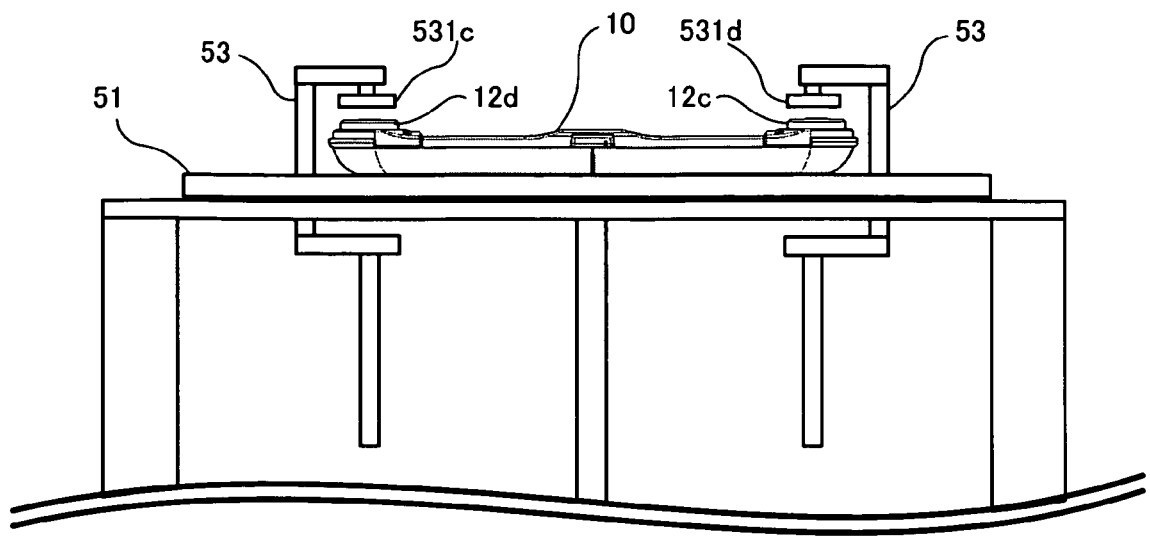
FIG. 8A is a diagram illustrating a state where the weight measuring apparatus 10 is placed on a placement table 51.
Figure 8B:
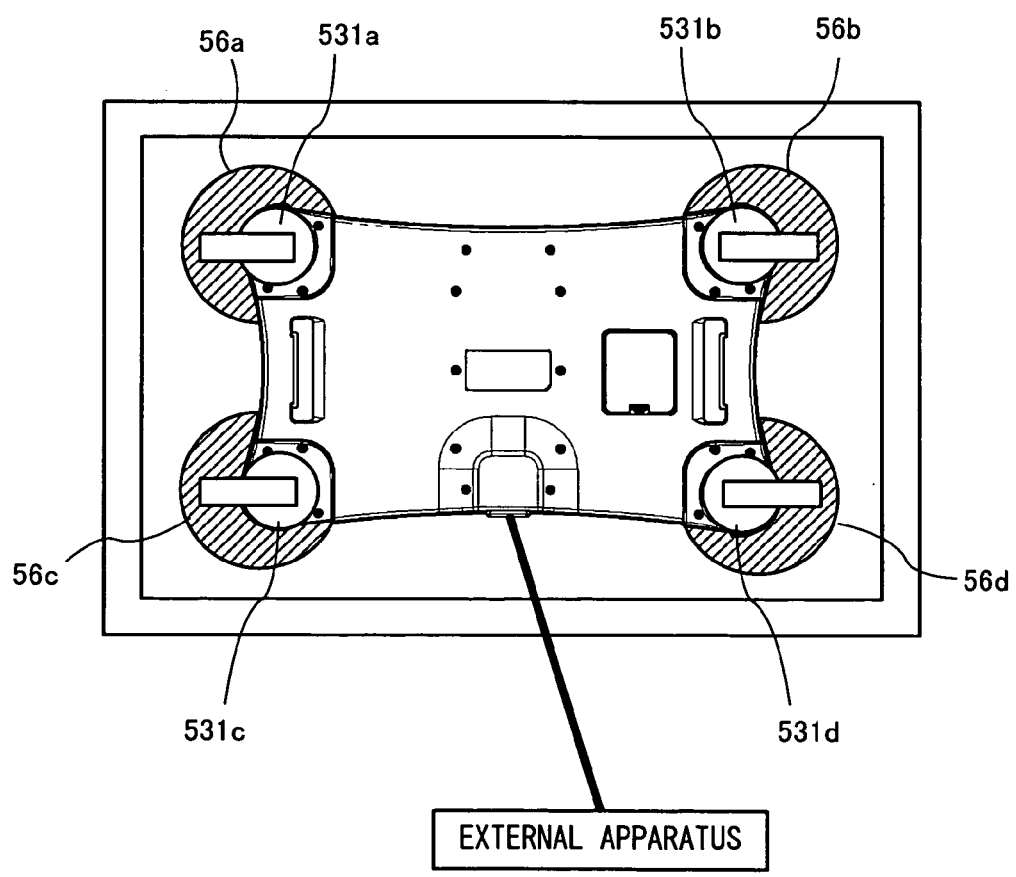
FIG. 8B is a diagram illustrating the state where the weight measuring apparatus 10 is placed on a placement table 51.

Firstly, the weight measuring apparatus 10 is placed on the placement table 51 with a load platform surface of the weight measuring apparatus 10 facing downward (i.e., in an inverted position) (step 1). At this time, the weight measuring apparatus 10 is placed on the placement table 51 such that the load sensor sections 12 are located at positions where the through holes 56a to 56d are provided, respectively. In other words, the weight measuring apparatus 10 is placed on the placement table 51 such that the load sensor sections 12a to 12d are located under the load applying plate 531a to 531d of the hook portions 53a to 53d, respectively. FIG. 8A is a front view illustrating a state where the weight measuring apparatus 10 is placed on the placement table 11. FIG. 8B is a plan view illustrating the state where the weight measuring apparatus 10 is placed on the placement table 11.

Then, the connector 13 is connected to the external apparatus (step 2). The external apparatus is used for monitoring a load value outputted from the weight measuring apparatus 10 and causing the microcomputer 31 to write the load value, for example.

Next, in a state where no load (i.e., 0 kg) is applied to each of the load sensor sections 12, a detection value thereof is obtained. Thereafter, the external apparatus causes a RAM of the microcomputer 31 to store the detection value so as to be associated with each of the load sensor sections 12 (step 3).

Then, each of the hoisting and lowering mechanisms 55 is used to lift the weight 54, and the weight 54 having a predetermined weight (e.g., 17 kg) is attached to the attachment portion 532 of each of the four hook portions 53 (step 4). In this state, the weight 54 is supported by each of the hoisting and lowering mechanisms 55. Note that it is preferable that the weights 54 attached to the hook portions 53, respectively, have the same weight as one another.

Next, after attaching the weights 54 to the hook portions 53, respectively, the hoisting and lowering mechanisms 55 are used to simultaneously bring down the weights 54 attached at four locations, respectively (step 5). In this state, the weight 54 attached to each of the hook portions 53 is not supported by the hoisting and lowering mechanism 55. As a result, each of the hook portions 53 is lowered by the weight of the weight 54, and the load applying plate 531 contacts each of the load sensor sections 12 located so as to be opposed thereto, thereby pressing down each of the load sensor sections 12. Thus, it becomes possible to directly apply a load corresponding to the weight of the weight 54 attached to each of the hook portions 53 to each of the load sensor sections 12.

Then, the external apparatus obtains the detection value outputted from each of the load sensor sections 12. Thereafter, the external apparatus causes the RAM of the microcomputer 31 to store the detection value as information on the weight of the currently attached weight 54 (i.e., as a detection value obtained when a load of 17 kg is applied) so as to be associated with each of the load sensor sections 12 (step 6).

Such a process of applying a desired load to each of the load sensor sections 12 and causing the microcomputer 31 to store a detection value of each of the load sensor sections 12 to which the desired load is currently applied (steps 4 to mentioned above) is repeated by using a load having a desired weight value. For example, loads of 34 kg, 68 kg and 102 kg are sequentially applied to each of the load sensor sections 12, and the microcomputer 31 is caused to store a detection value detected when each of the loads is applied to each of the load sensor sections 12. FIG. 9 shows an example of data stored in the RAM of the microcomputer 31 as a result of such a process. In FIG. 9, data, indicating a detection value outputted from each load cell 23 each time a load having a predetermined weight is applied, is stored for each of the load sensor sections 12. Note that in FIG. 9, the data indicating the detection value outputted from the load cell 23 is represented as an AD converted value. As such, the calibration according to the first embodiment is finished.

When the weight measuring apparatus 10 calibrated in such a manner as described above is actually used, a value detected by each of the load sensor sections 12 and the data as shown in FIG. 9 are used. For example, in the external apparatus (e.g., a game apparatus) connected to the weight measuring apparatus 10, the detection value of each of the load sensor sections 12 and the data shown in FIG. 9 are obtained from the weight measuring apparatus 10. Thereafter, a predetermined calculation process is performed based on the aforementioned value and data, thereby calculating the weight.

As described above, in the present embodiment, a load can be independently applied to each of the four load sensor sections 12. Thus, a more proper calibration can be performed on each of the load sensor sections 12, thereby making it possible to improve a measurement accuracy of the weight measuring apparatus 10. As a result, in the case where a balance state of a measurement target object is detected based on an output value of each of the load sensors, for example, it becomes possible to more accurately recognize the balance state of the measurement target object.

In the above embodiment, as a mechanism to apply a load to each of the load sensor sections 12, the weight measuring apparatus 10 is placed on the placement table 51 in an inverted position, and then the weight 54 is attached to the hook portion 53, thereby applying a load to each of the load sensor sections 12. However, the present invention is not limited thereto. Other mechanisms may also be used if they directly apply a load to each of the load sensor sections 12. For example, the weight measuring apparatus 10 may be placed on the placement table 51 without being inverted such that a load is applied to each of the load sensor sections 12 through the through hole 56 so as to press up the weight measuring apparatus 10 from below.

In the above embodiment, the external apparatus is used to cause the microcomputer 31 to store the data indicating the detection value outputted from the load cell 23. However, a function corresponding to the external apparatus may be embedded in the weight applying unit 50. For example, a connection section electrically connectable to the connector 13 of the weight measuring apparatus 10, a control section having a calculation control function such as a CPU, and an operation section for transmitting an instruction to the control section may be mounted in the weight applying unit 50. Then, a process as shown in step 6 mentioned above may be performed by means of the control section. In such an example as described above, it is unnecessary to prepare an external apparatus in a separate manner.

Second Embodiment

Next, a second embodiment of the present invention will be described with reference to FIGS. 10 to 16. In the first embodiment described above, a load of the weight 54 is applied to each of the load sensor sections 12 so as to perform a calibration. In the case where the calibration is performed in such a manner as described above, a measurement error can be substantially suppressed as compared to when using a conventional calibration method. However, under actual usage conditions, in the case where the weight measuring apparatus 10 is mounted in the place of use and a person, for example, steps onto the load platform 11, the load platform 11 is more or less deflected due to the weight of the person, as shown in FIG. 10. That is, the frame 15 forming the weight measuring apparatus 10 is deformed due to the weight of the person, and each of load sensor sections 12 is accordingly slightly inclined in its entirety. As a result, as shown in FIG. 11, the load cell 23 is to be accordingly slightly inclined in its entirety. When the measurement is performed in a state described above, the measurement error would be more or less generated even if the calibration according to the first embodiment is performed.

Specifically, the calibration according to the first embodiment assumes that a load applied to each load sensor section 12 (load cell 23) is measured when the load sensor section 12 is in a horizontal state. However, under actual usage conditions, the load applied to each load sensor section 12 is measured when the load cell 23 is inclined in its entirety due to the aforementioned deflection. Therefore, since the calibration is performed assuming that the load sensor section 12 is in a horizontal state, a measurement error between an actual weight and a detection value thereof is generated. Thus, in the second embodiment, a calibration is performed in a state where the aforementioned deflection is taken into consideration, in other words, in a state similar to an actual usage state where the load cell 23 is inclined in its entirety.

Figure 12:
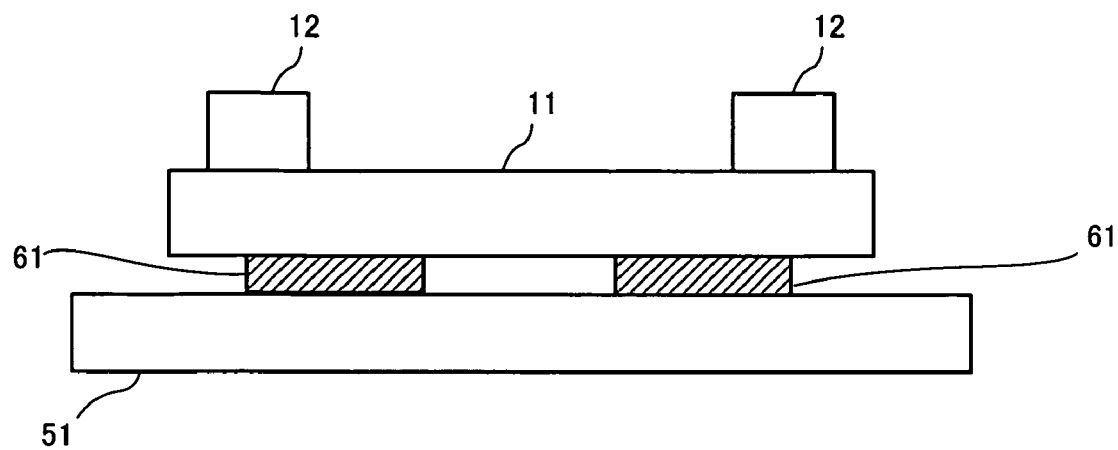
FIG. 12 is a schematic diagram illustrating a state where the weight measuring apparatus 10 is placed on the placement table 51 with a deflection generating member 61 interposed therebetween.
Figure 13:
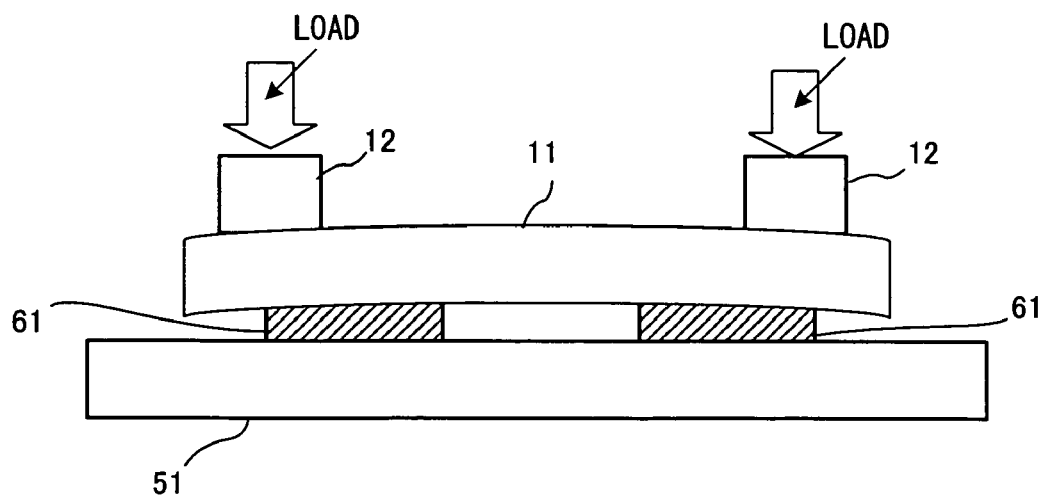
FIG. 13 is a schematic diagram illustrating a state where a load is applied with the deflection generating member 61 interposed between the weight measuring apparatus 10 and the placement table 51.

Next, a principle of the weight applying/calibration method according to the second embodiment will be described. Note that the weight applying unit 50 according to the second embodiment is the same as that of the first embodiment except for a deflection generating member 61 to be described below. Therefore, the same components as those of the first embodiment will be denoted by the same reference numerals and will not be further described below. In the second embodiment, when the weight measuring apparatus 10 is placed on the placement table 51 in such a manner as described above, the deflection generating member 61 (to be described later in detail) is disposed so as to be interposed between the placement table 51 and the weight measuring apparatus 10. FIG. 12 is a schematic diagram illustrating a state where the deflection generating member 61 is disposed so as to be interposed between the weight measuring apparatus 10 and the placement table 51. In this state, similarly to the first embodiment, the weight 54 is attached to each of the hook portions 53, thereby applying the weight of the weight 54 to each of the load sensor sections 12. Therefore, as shown in FIG. 13, it is possible to create a state where the deflection as mentioned above is generated in the weight measuring apparatus 10. Thus, a proper calibration can be performed taking into consideration the deflection generated under actual usage conditions.

Figure 14:
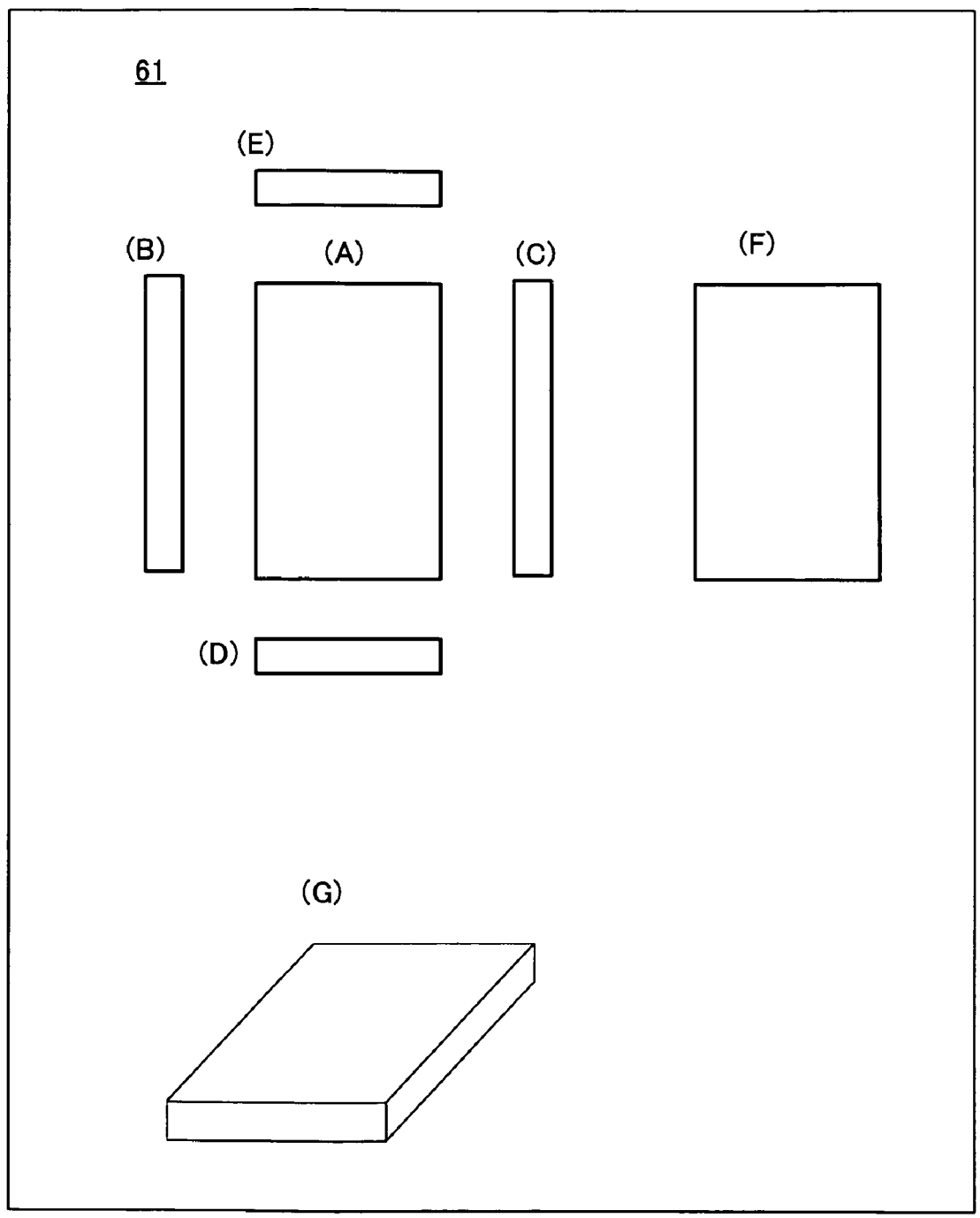
FIG. 14 is a diagram illustrating an example of the deflection generating member 61.
Figure 17:
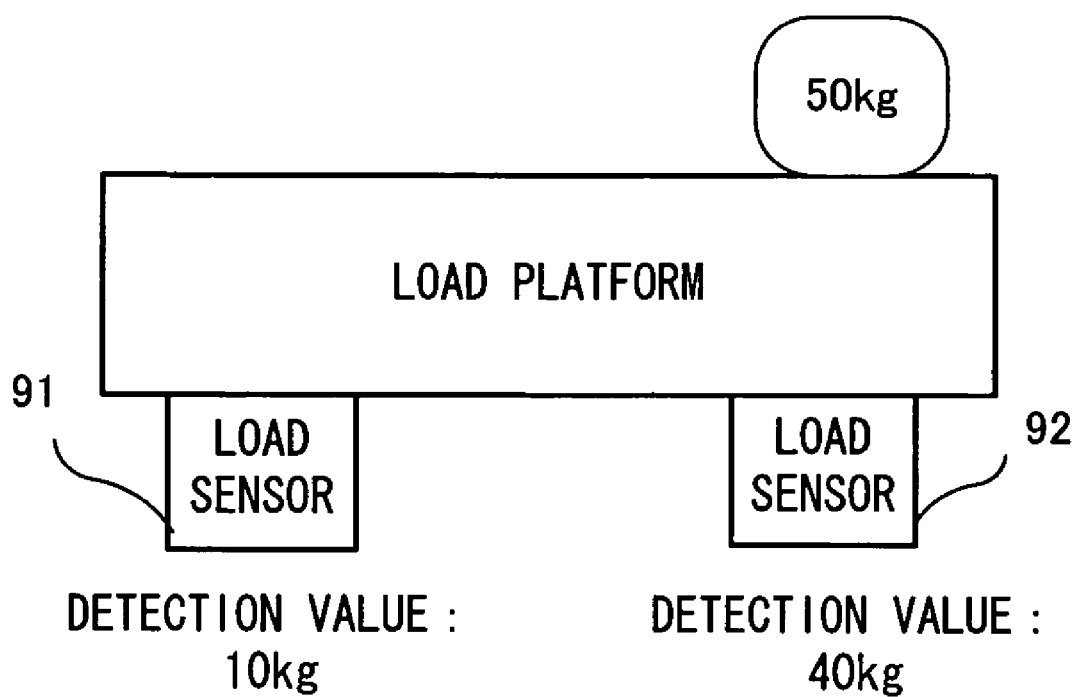
FIG. 17 is a diagram illustrating an example of values detected by load sensors when a weight is placed on a load platform.

Hereinafter, the deflection generating member 61 will be described in detail. FIG. 14 is a diagram illustrating an example of an external view of the aforementioned deflection generating member 61. FIG. 14 includes seven images: (A) is a plan view; (B) is a left side view; (C) is a right side view; (D) is a front view; (E) is a back view; (F) is a bottom view; and (G) is a perspective view. As shown in FIG. 14, the deflection generating member 61 has a rectangular plate-like shape. The rectangular plate-like shape is a shape simulating an area in which a weight measurement target object contacts the load platform (i.e., an area to which a load is applied). In the present embodiment, it is assumed that the aforementioned area is a sole of the foot. Considering variations in size of a sole of the foot among individuals and preventing an applied load from being concentrated onto one spot, the deflection generating member 61 has a rectangular shape having a substantial area. In the present embodiment, it is also assumed that one deflection generating member 61 is one foot. Therefore, a total of two deflection generating members, as both feet, are used.

Next, a material of the deflection generating member 61 will be described. The material used for the deflection generating member 61 has preferably elasticity to some extent. This is because even when a stress is applied to an end of the deflection generating member 61 in a state where a load is applied to the weight measuring apparatus 10 and deflection is generated, the stress would be dispersed if the deflection generating member 61 had the elasticity, thereby not hampering the deflection of the weight measuring apparatus 10. Furthermore, with the elasticity, the load platform surface of the weight measuring apparatus 10 can be prevented from being damaged through calibration steps. In the present embodiment, the deflection generating member 61 is made of ester polyurethane as an example. Specifically, the ester polyurethane has a specific gravity of 1.20, a Shore hardness of Shore A70 (i.e., approximately a hardness of a rubber ball used in baseball), a tensile strength of 31.3 Mpa, an elongation of 650%, a heat resistance of 70° C., and a cold resistance of −20° C.

Then, a difference between an effect produced when a calibration is performed with the deflection generating member 61 and an effect produced when a calibration is performed without the deflection generating member 61 will be described with reference to FIGS. 15 and 16. FIG. 15 is a table showing results detected by a test unit other than the weight applying unit 50 when weights of 34 kg, 68 kg, 102 kg and 136 kg are placed on the load platform of the weight measuring apparatus 10 on which a calibration is performed without the deflection generating member 61 (i.e., by using the method of the first embodiment). Also, FIG. 16 is a table showing results detected by the test unit other than the weight applying unit 50 when the weights of 34 kg, 68 kg, 102 kg and 136 kg are placed on the load platform of the weight measuring apparatus 10 on which a calibration is performed with the deflection generating member 61 (i.e., by using the method of the second embodiment). In each of FIGS. 15 and 16, the measurement is performed ten times for each of the weights ("sample No" indicates an Nth measurement (N is an integer of 1 to 10)). Also, a maximum value, a minimum value and an average value among values obtained by ten measurements are indicated as "MAX", "MIN" and "AVG", respectively. A difference between the average value AVG and the weight of an actually placed weight (a reference value) is indicated as "difference from reference value".

For example, when the weight of 34 kg is placed, "difference from reference value" is "−0.191" in FIG. 15, while the value is "−0.027" in FIG. 16. That is, an error between the weight of an actual measurement object and a detection value thereof is smaller when using the weight measuring apparatus 10 on which a calibration is performed with the deflection generating member 61.

Also, in FIG. 15, "difference from reference value" obtained when the weight of 34 kg is placed is "−0.191" while the value obtained when the weight of 136 kg is placed is "−0.504", and a difference between the aforementioned two values is "0.313". On the other hand, in FIG. 16, "difference from reference value" obtained when the weight of 34 kg is placed is "−0.027" while the value obtained when the weight of 136 kg is placed is "0.133", and a difference between the aforementioned two values is "0.106", which is smaller than "0.313" in FIG. 15. That is, in both cases shown in FIGS. 15 and 16, "difference from reference value" tends to be greater as the weight of a measurement object is increased. However, the fluctuation of "difference from reference value" varied in accordance with the weight of the measurement object is smaller in the case shown in FIG. 16. That is, a more accurate measurement can be performed when using the weight measuring apparatus 10 on which a calibration is performed with the deflection generating member 61.

As described above, in the present embodiment, a calibration is performed with the deflection generating member 61, thereby making it possible to create a state more similar to actual usage conditions. Therefore, a proper calibration can be performed, and thus a measurement accuracy of the weight measuring apparatus 10 also can be improved accordingly.

In the second embodiment, the aforementioned deflection is generated by interposing an elastic member (the deflection generating member made of polyurethane) between the placement table 51 and the weight measuring apparatus 10. However, the present invention is not limited to the above example of such a member interposed between the placement table 51 and the weight measuring apparatus 10 if the deflection is generated. For example, a through hole may be provided through the placement table 51 at a position where the deflection generating member 61 is to be disposed, so as to create a mechanism to mechanically apply pressure to the load platform 11 through the through hole from below.

While the invention has been described in detail, the foregoing description is in all aspects illustrative and not restrictive. It is understood that numerous other modifications and variations can be devised without departing from the scope of the invention.

What is claimed is:

1. A weight applying unit for calibration used for performing a calibration on a separate weight measuring apparatus having a load platform connected to at least a first load sensor section and a second load sensor section and wherein a weight of a measurement target object placed on the load platform is measured based on a load value detected by each of the load sensor sections, the weight applying unit for calibration comprising:

a support section for receiving and supporting the weight measuring apparatus;

a deflection generating portion operatively associated with said support section and for generating deflection by applying a predetermined pressure to a load platform surface of the weight measuring apparatus; and a weight applying section operatively coupled to said support section for controllably and individually applying predetermined loads to at least the first load sensor section and the second load sensor section of said weight measuring apparatus, said weight applying section being operable in a first position to apply no load to the first load sensor section and said second load sensor section and in a second position to apply a predetermined load to said first load sensor section and a predetermined load to said second load sensor section.

2. The weight applying unit for calibration according to claim 1, wherein said support section supports a load platform of the weight measuring apparatus such that the load platform surface is in a horizontal position, and the weight applying section applies the predetermined loads to the plurality of load sensor sections, respectively, in a direction perpendicular to the load platform surface.

3. The weight applying unit for calibration according to claim 2, wherein the support section has a placement table for placing the weight measuring apparatus thereon, the weight measuring apparatus is placed on the placement table such that the load platform surface of the weight measuring apparatus and a load surface of the placement table face horizontally toward each other, and the deflection generating portion is an elastic body disposed so as to be interposed between the load surface of the placement table and the load platform surface of the weight measuring apparatus.

4. The weight applying unit for calibration according to claim 3, wherein the deflection generating portion is an elastic body having a shape simulating an area in which the measurement target object contacts the load platform.

5. The weight applying unit for calibration according to claim 2, wherein said support section supports the weight measuring apparatus such that the load platform surface of the weight measuring apparatus faces a gravitational direction, and the weight applying section applies the predetermined loads in a downward direction.

6. The weight applying unit for calibration according to claim 5, wherein the support section has a placement table for placing the weight measuring apparatus thereon, the weight measuring apparatus is placed on the placement table such that the load platform surface of the weight measuring apparatus and a load surface of the placement table face horizontally toward each other, and the deflection generating portion is an elastic body disposed so as to be interposed between the load surface of the placement table and the load platform surface of the weight measuring apparatus.

7. The weight applying unit for calibration according to claim 6, wherein the deflection generating portion is an elastic body having a shape simulating an area in which the measurement target object contacts the load platform.

8. The weight applying unit for calibration according to claim 1, wherein values of the predetermined loads applied by the weight applying section to the plurality of load sensor sections, respectively, are the same as one another.

9. The weight applying unit for calibration according to claim 8, wherein the support section has a placement table for placing the weight measuring apparatus thereon, the weight measuring apparatus is placed on the placement table such that the load platform surface of the weight measuring apparatus and a load surface of the placement table face horizontally toward each other, and the deflection generating portion is an elastic body disposed so as to be interposed between the load surface of the placement table and the load platform surface of the weight measuring apparatus.

10. The weight applying unit for calibration according to claim 9, wherein the deflection generating portion is an elastic body having a shape simulating an area in which the measurement target object contacts the load platform.

11. The weight applying unit for calibration according to claim 1, wherein said support section has a placement table for placing the weight measuring apparatus thereon, the weight measuring apparatus is placed on the placement table such that the load platform surface of the weight measuring apparatus and a load surface of the placement table face horizontally toward each other, and the deflection generating portion is an elastic body disposed so as to be interposed between the load surface of the placement table and the load platform surface of the weight measuring apparatus.

12. The weight applying unit for calibration according to claim 11, wherein said deflection generating portion is an elastic body having a shape simulating an area in which the measurement target object contacts the load platform.

13. The weight applying unit for calibration according to claim 11, wherein said deflection generating portion is an elastic body having a Shore hardness of Shore A70.

14. The weight applying unit for calibration according to claim 11, wherein the deflection generating portion is made of ester polyurethane.

15. The weight applying unit for calibration according to claim 1, further comprising:
a detection value obtaining section for obtaining a detection value outputted from each of the plurality of load sensor sections to which the predetermined loads are applied, respectively, by the weight applying section; and
a storing section for storing the detection value obtained by the detection value obtaining section in the weight measuring apparatus so as to be associated with each of the load sensor sections which has outputted the detection value.

16. The weight applying unit for calibration according to claim 15, wherein the weight applying section can apply the load value applied to each of the plurality of load sensor sections, and the storing section stores, in the weight measuring apparatus, data detected based on a plurality of load values by applying loads having values different from each other.

17. A weight applying method for calibration used for performing a calibration on a separate weight measuring apparatus having a load platform connected to at least a first load sensor section and a second load sensor section, the weight applying method for calibration comprising:
a supporting step of receiving and supporting the weight measuring apparatus;
a deflection generating step for generating deflection by applying a predetermined pressure to a load platform surface of the weight measuring apparatus; and
a weight applying step of controllably and individually applying predetermined loads using a weight applying section to at least the first load sensor section and the second load sensor section of said weight measuring apparatus, said weight applying section being operable in a first position to apply no load to the first load sensor section and said second load sensor section and in a second position to apply a predetermined load to said first load sensor section and a predetermined load to said second load sensor section.

* * * * *